(12) United States Patent
Sevindik et al.

(10) Patent No.: US 11,297,515 B2
(45) Date of Patent: *Apr. 5, 2022

(54) METHODS AND APPARATUS FOR PROVIDING BACKHAUL SERVICES

(71) Applicant: Charter Communications Operating, LLC, St. Louis, MO (US)

(72) Inventors: Volkan Sevindik, Parker, CO (US); Haider Syed, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 95 days.

This patent is subject to a terminal disclaimer.

(21) Appl. No.: 16/840,934

(22) Filed: Apr. 6, 2020

(65) Prior Publication Data
US 2020/0236561 A1 Jul. 23, 2020

Related U.S. Application Data

(63) Continuation of application No. 16/049,354, filed on Jul. 30, 2018, now Pat. No. 10,667,142.

(51) Int. Cl.
| | |
|---|---|
| *H04W 16/26* | (2009.01) |
| *H04W 16/18* | (2009.01) |
| *H04W 72/04* | (2009.01) |
| *H04W 76/14* | (2018.01) |
| *H04W 76/15* | (2018.01) |

(52) U.S. Cl.
CPC ........... *H04W 16/26* (2013.01); *H04W 16/18* (2013.01); *H04W 72/04* (2013.01); *H04W 76/14* (2018.02); *H04W 76/15* (2018.02)

(58) Field of Classification Search
CPC ..... H04W 16/26; H04W 16/14; H04W 76/15; H04W 28/0247; H04W 76/14; H04W 16/18; H04W 72/04; H04W 72/0453; H04W 4/80
See application file for complete search history.

(56) References Cited

U.S. PATENT DOCUMENTS

| | | | | |
|---|---|---|---|---|
| 8,553,711 | B2 * | 10/2013 | Borran ................... | H04W 16/02 370/431 |
| 9,743,249 | B2 * | 8/2017 | Tsai ....................... | G01S 5/0072 |
| 10,327,150 | B2 * | 6/2019 | Markwart .......... | H04B 7/15542 |

(Continued)

*Primary Examiner* — Ahmed Elallam
(74) *Attorney, Agent, or Firm* — Straub & Straub; Stephen T. Straub; Michael P. Straub

(57) ABSTRACT

Methods and apparatus for providing backhaul capacity to a first Citizens Broadband Radio Service Device (CBSD) using a device to device connection to a second CBSD. An exemplary method embodiment includes operating a first Citizens Broadband Radio Service Device (CBSD) to: (i) establish a wireless device to device (D2D) communications link with a second CBSD using D2D wireless communications resources; (ii) send, via the D2D communications link, a first backhaul resource reservation signal to the second CBSD to reserve a first portion of a communications backhaul extending from the second CBSD to a service provider communication network; and (iii) communicate data for a user equipment device (UE) being served by the first CBSD to said service provider communications network via said D2D communications link and the communications backhaul extending from the second CBSD.

20 Claims, 12 Drawing Sheets

(56) References Cited

U.S. PATENT DOCUMENTS

| | | | |
|---|---|---|---|
| 10,405,197 B2* | 9/2019 | Ashrafi | H04L 41/0823 |
| 10,419,943 B1* | 9/2019 | Wong | H04W 16/28 |
| 10,492,204 B2* | 11/2019 | Kakinada | H04L 69/18 |
| 10,667,142 B2* | 5/2020 | Sevindik | H04W 72/04 |
| 11,032,717 B2* | 6/2021 | Huang | H04J 11/005 |
| 2017/0150503 A1* | 5/2017 | Fukuta | H04W 72/0453 |
| 2019/0104489 A1* | 4/2019 | Huang | H04W 60/00 |
| 2019/0289470 A1* | 9/2019 | Vaidya | H04W 16/14 |

* cited by examiner

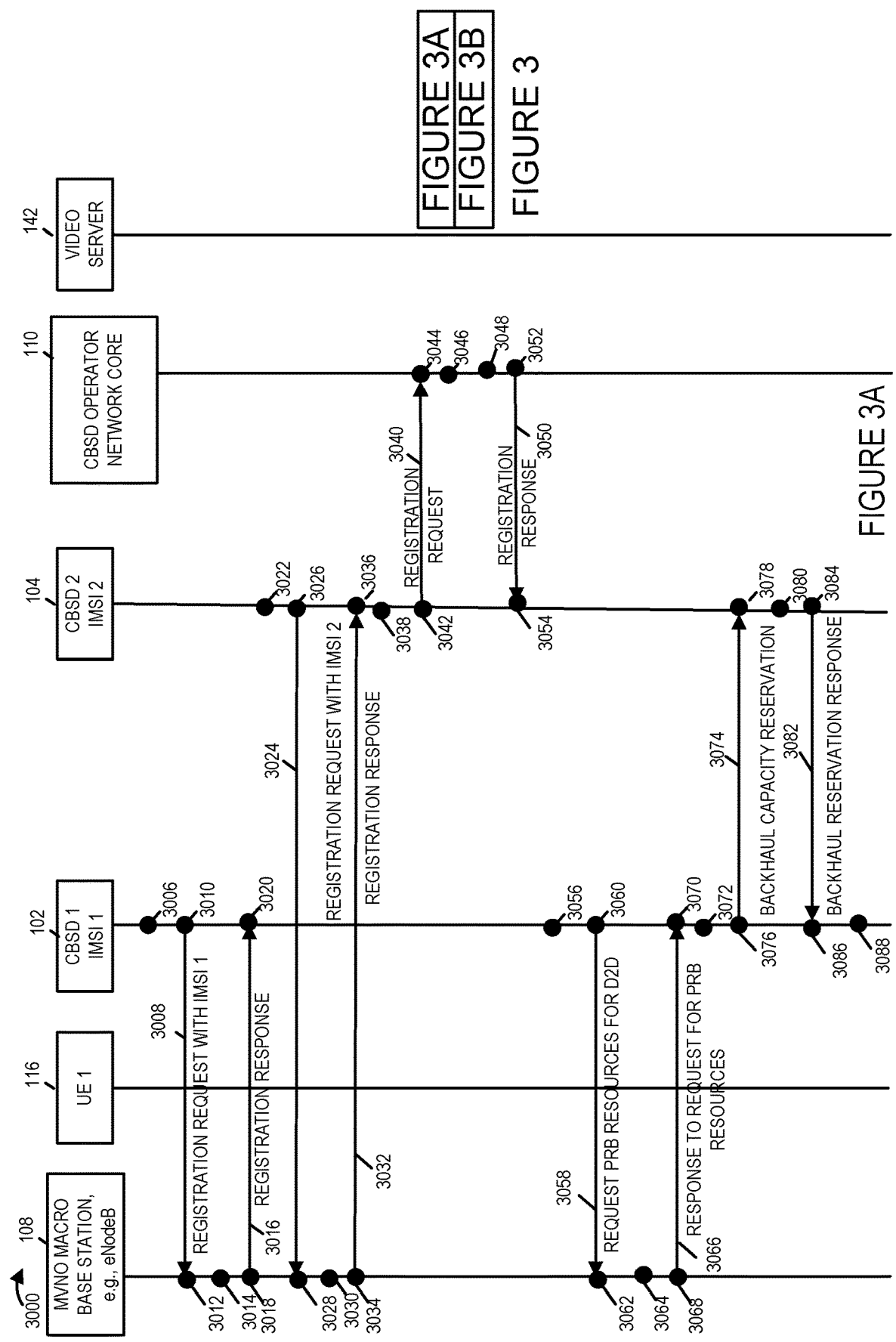

METHODS AND APPARATUS FOR PROVIDING BACKHAUL SERVICES

RELATED APPLICATIONS

The present application is a continuation of U.S. patent application Ser. No. 16/049,354 filed on Jul. 30, 2018 which is hereby expressly incorporated by reference in its entirety.

FIELD OF INVENTION

The present invention relates to methods and apparatus for providing backhaul connections to a service provider network in a Citizens Broadband Radio Service (CBRS) network. More particularly, the present invention relates to methods and apparatus for providing a first Citizens Broadband Radio Service Device a backhaul connection to a service provider network via a device to device wireless connection to a second Citizens Broadband Radio Service Device which is connected to the service provider network.

BACKGROUND OF THE INVENTION

In a Citizens Broadband Radio Service (CBRS) network, Citizens Broadband Radio Service Devices CBSDs serve as access points which can support communications between a user equipment device (UE) and a service provider network.

A CBRS network often includes one or more Citizens Broadband Radio Service Devices (CBSDs) with relatively small coverage areas as compared to a macro base station or access point. In a CBRS network, interference is managed through power management of CBSD devices by a management device in the network referred to as a Spectrum Access System (SAS).

The Citizens Broadband Radio Service network utilizes the 150 megahetz in the 3550-3700 MHz band referred to as the 3.5 GHz Band. Not all CBSD devices are located so that they can be provided a backhaul connection, e.g., cable wired or fiber optic connection, to an operator's core network. In other situations such as for example where the CBSD is acting as a hot spot it may not be cost effective to provide a backhaul connection from the CBSD to the operator's core network. In still other situations, it may be useful to make a CBSD base station operational in a short period of time to address emergency or other short term high traffic needs without the time or expense of connecting the CBSD to an operator's core network. Furthermore, there are still other situations in which operating the CBSD to provide UE devices network services is highly desirable without expending the high costs of wiring the CBSD to an operator's network. Moreover, there are cost advantages to not building out a wired or fiber optic cable network to include all CBSDs when doing so for CBSD's in low density areas would be prohibitively expensive. However, it is desirable and advantageous for a Citizens Broadband Radio Service network operator to be able to provide as broad a coverage area as possible for its users while not expending large sums of money to expand the wired network to connect every CBSD device via a hardwired connection to the operator's network or using the CBRS network's wireless resources for backhaul connections.

In view of the foregoing comments, it should be appreciated that there is a need for new and improved methods, systems and apparatus to solve the technological communications and network centric problem of how to provide CBRS coverage and network services in areas to which the CBSD device does not have a backhaul connection to the CBRS operator's network in a cost efficient and effective manner. There is also a need for new and/or improved methods, apparatus and systems that address the technological communications and network centric problem of how to provide backhaul capacity to a CBSD device which does not have a backhaul connection to the CBSD's core network. There is also a need for providing backhaul capacity to a CBSD device which does not have a backhaul connection to the CBSD's core network without using the CBRS networks frequency spectrum.

SUMMARY OF THE INVENTION

The present invention relates to methods, system and apparatus for providing backhaul connections to a service provider network in a Citizens Broadband Radio Service (CBRS) network. More particularly, the present invention relates to methods, apparatus and systems for providing a Citizens Broadband Radio Service Device a backhaul connection to a service provider network via a wireless device to device connection to another CBSD which does have a backhaul connection to the service provider. The device to device connection being implemented using the communications resources of a MVNO network to which both CBSDs participating in the device to device connection are registered and appear as user equipment devices. One or more embodiments of the present invention are directed to solving the aforementioned problems.

An exemplary method embodiment of present invention includes the steps of operating a first Citizens Broadband Radio Service Device (CBSD) to: (i) establish a wireless device to device (D2D) communications link with a second CBSD using D2D wireless communications resources; (ii) send, via the D2D communications link, a first backhaul resource reservation signal to the second CBSD to reserve a first portion of a communications backhaul extending from the second CBSD to a service provider communication network; and (iii) communicate data for a user equipment device (UE) being served by the first CBSD to said service provider communications network via said D2D communications link and the communications backhaul extending from the second CBSD.

Prior to establishing the wireless D2D link the first CBSD is operated to: (i) send a first registration signal to a first base station of a wireless network service provider (e.g., LTE marco network service provider) to register with the wireless network service provider, and (ii) send a first D2D resource request message to the first base station to request wireless D2D communications resources for communicating with the second CBSD. Prior to establishing the wireless D2D link, the second CBSD is operated to send a second registration signal to the base station of the wireless network service provider (e.g., LTE marco network service provider) to register with the wireless network service provider. The first registration signal is typically a signal to register the first CBSD as a mobile service subscriber in the wireless network of the wireless network service provider; and the second registration signal is typically a signal to register the second CBSD as a mobile service subscriber in the wireless network of wireless network service provider.

In some embodiments, the first and second CBSDs each include a Subscriber Identity Module (SIM) card. The first CBSD appears as a first UE to the wireless network while the second CBSD appears as a second UE to the wireless network.

In some embodiments, the wireless network is an LTE wireless network and the D2D communications link is an LTE D2D communications link.

In various embodiments, the first D2D resource request message requests a first amount of wireless D2D communications resources, said first amount of wireless D2D communications resources being based on an expected amount of data to be transmitted over the backhaul of the second CBSD on behalf of user equipment devices serviced by the first CBSD during a first period of time.

The first CBSD in most embodiments is operated to receive, via the D2D communications link, a backhaul resource grant signal from the second CBSD indicating that the first portion of the second CBSD's backhaul has been reserved for use by first CBSD.

In some embodiments, the second CBSD is operated to communicate data corresponding to a UE served by the first CBSD and data corresponding to a UE served by the second CBSD over said second CBSD's backhaul.

In many embodiments, the first CBSD does not have a wired backhaul connection to the service provider network or the wireless service provider network. In some embodiments, the first CBSD includes a first set of antennas and a second set of antennas. In such method embodiments, the method includes using the first set of antennas to receive and transmit signals to the base station of the wireless network service provider and to the second CBSD; and using the second set of antennas for communications with user equipment devices served by the first CBSD.

The first CBSD communicates with the second CBSD using a first frequency band while the first CBSD communicates with user equipment devices served by the first CBSD using a second frequency band which is different from the first frequency band. In some such embodiments, first frequency band is a licensed frequency band used by a macro base station operator and wherein the first base station is a macro base station.

The present invention is applicable to apparatus and system embodiments wherein one or more devices implement the steps of the method embodiments. In some apparatus embodiments each of CBDS, user equipment devices, SAS devices, registrars, macro base stations and each of the other apparatus/devices of the system include one or more processor and/or hardware circuitry, input/output interfaces including receivers and transmitters, and a memory. The memory including instructions when executed by the processor control the apparatus/device of the system to operate to perform the steps of various method embodiments of the invention.

The present invention is also applicable to and includes apparatus and systems such as for example, apparatus and systems that implement the steps of the method embodiments. For example, an exemplary communications system embodiments comprises: a first Citizens Broadband Radio Service Device (CBSD) including a first processor configured to control the first CBSD to: establish a wireless device to device (D2D) communications link with a second CBSD using D2D wireless communications resources; send, via the D2D communications link, a first backhaul resource reservation signal to the second CBSD to reserve a first portion of a communications backhaul extending from the second CBSD to a service provider communication network; and communicate data for a user equipment device (UE) being served by the first CBSD to said service provider communications network via said D2D communications link and the communications backhaul extending from the second CBSD.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 3 illustrates the combination of FIG. 3A and FIG. 3B.

FIG. 3A illustrates a first part of an exemplary signaling diagram and method in accordance with an exemplary embodiment of the present invention.

DETAILED DESCRIPTION

Figure 1:
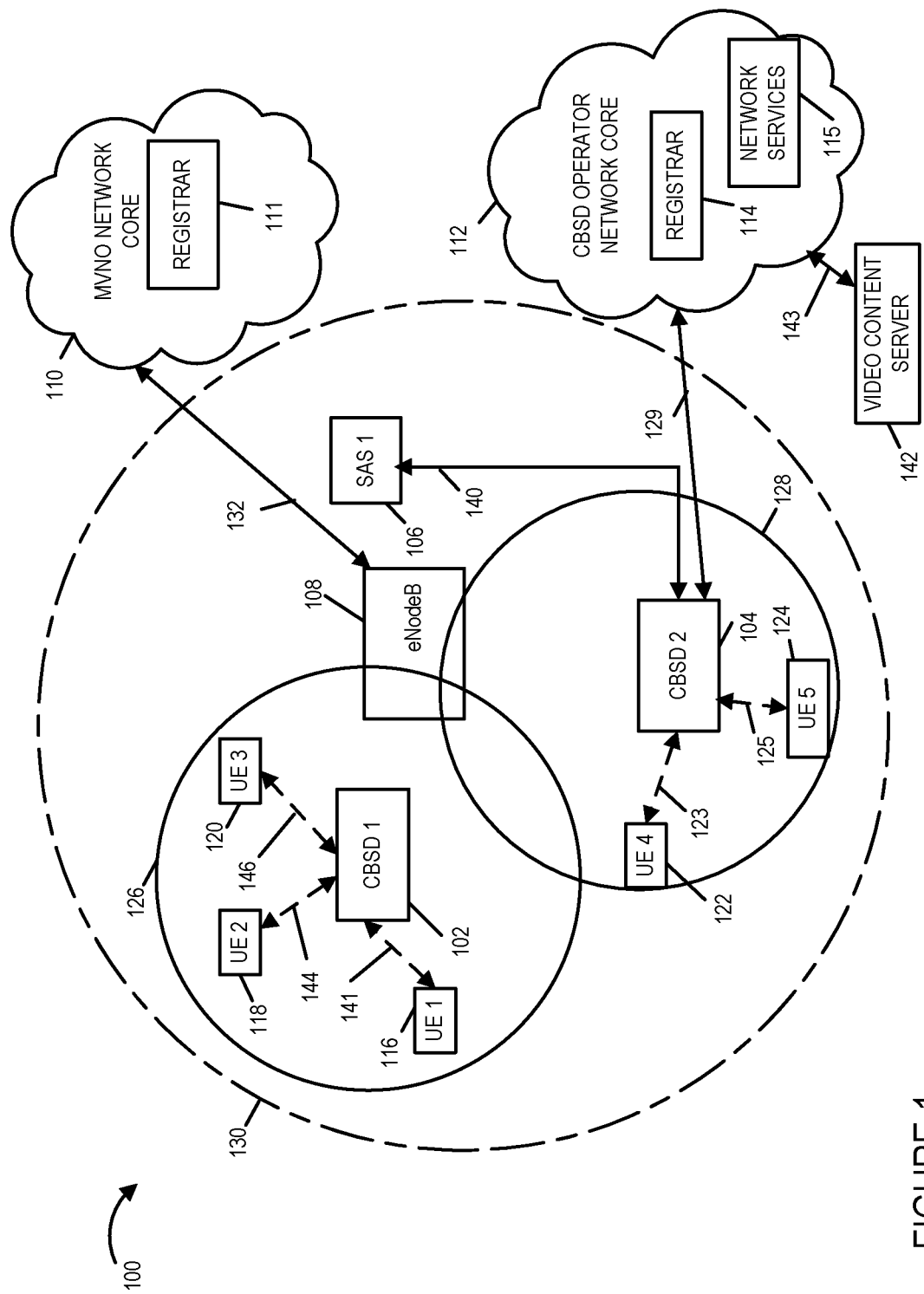
FIG. 1 illustrates an exemplary communications system in accordance with one embodiment of the present invention.

The current invention is applicable to Citizens Broadband Radio Service (CBRS) networks that provide wireless communications services. The present invention relates to methods, systems and apparatus for providing backhaul capability to Citizens Broadband Radio Service Devices that do not have a backhaul connection, e.g., wired connection, to a core network such as for example a service provider network.

Citizens Broadband Radio Service networks are networks that include user equipment devices, e.g., mobile or wireless devices such as for example cell phones, smart phones, laptops, tablets, Citizens Broadband Radio Service Devices (CBSDs) which serve as access points/base stations, and Spectrum Access Systems which provides spectrum assignments and manages frequency interference through power management of the CBSDs transmission power. The Citizens Broadband Radio Service network utilizes the 150 megahetz in the 3550-3700 MHz band referred to as the 3.5 GHz Band. The CBRS network includes Spectrum Access Systems that obtain information about registered or licensed commercial users in the 3.5 GHz band from FCC databases and information about federal incumbent users of the band from ESC (Environmental Sensing Capability) system and interact directly or indirectly with CBSDs operating in the band to ensure that Citizens Broadband Radio Service users operate in a manner consistent with their authorizations and promote efficient use of the spectrum resource. Among the Spectrum Access System functions as defined in the Amendment of the Commission's Rules with Regard to Commercial Operations in the 3550-3650 MHz Band released Apr. 21, 2015 are that: it determines the available frequencies at a given geographic location and assign them to CBSDs; it determines the maximum permissible transmission power level for CBSDs at a given location and communicates that information to the CBSDs; it registers and authenticates the identification information and location of CBSDs; it enforces exclusion and protection zones, including any future changes to such Zones, to ensure compatibility between Citizens Broadband Radio Service users and incumbent federal operations; it protects Priority Access Licensees (PAL) from impermissible interference from other Citizens Broadband Radio Service users; ensures secure and reliable transmission of information between the SAS, ESC, and CBSDs; and it facilitates coordination and information exchange between SASs. Through the management of the CBSDs power transmission levels in a geographical area the SAS manages the radio interference in the geographical area.

The Citizens Broadband Radio Service network utilizes the 150 megahetz in the 3550-3700 MHz band referred to as the 3.5 GHz Band. Not all CBSD devices are located so that they can be provided a backhaul connection, e.g., cable wired or fiber optic connection, to an operator's core network. In other situations such as for example where the CBSD is acting as a hot spot it may not be cost effective to provide a backhaul connection from the CBSD to the operator's core network. In still other situations, it may be useful to make a CBSD base station operational in a short period of time to address emergency or other short term high traffic needs without the time or expense of connecting the CBSD to an operator's core network. Furthermore, there are still other situations in which operating the CBSD to provide UE devices network services without expending the high costs of wiring the CBSD to an operator's network. Moreover, there are cost advantages to not building out a wired or fiber optic cable network to include all CBSDs when doing so for CBSD's in low density areas would be prohibitively expensive. However, it is desirable and advantageous for a Citizens Broadband Radio Service network operator to be able to provide as broad a coverage area as possible for its users while not expending large sums of money to expand the wired network to connect every CBSD device via a hardwired connection to the operator's network. There is a need for new and improved methods, systems and apparatus to solve the technological communications and network centric problem of how to provide CBRS coverage and network services in areas to which the CBSD device does not have a backhaul connection, e.g., a wired connection to the CBRS operator's network in a cost effective manner.

There is also a need for new and/or improved methods, apparatus and systems that address the technology communications and network centric problem of how to provide backhaul capacity to a CBSD device which does not have a backhaul connection to the CBSD's core network.

Various embodiments of the present invention provide solutions to the aforementioned problems and in particular the CBRS network centric technological problem of how to provide backhaul services to a CBSD device that does not have a backhaul connection, e.g., a cable wired or fiber optic connection, to the operators network in a cost effective and efficient manner without using CBSR network frequency spectrum.

One exemplary communications system used to implement an exemplary embodiment in accordance with the present invention is shown in FIG. 1.

FIG. 1 illustrates an exemplary communications system 100 having an architecture implemented in accordance with the present invention. The communications system 100 includes a CBRS network coupled to a first operator core network, e.g., first service provider network, and a Mobile Virtual Network Operator (MVNO) Network. The CBRS wireless network is coupled to a first operator's network core 112 also sometimes referred to as the core network which may be for example an Long Term Evolution (LTE) Evolved Packet Core Network.

The MVNO network includes a MVNO network core 110 including a registrar 111, e.g., Home Subscriber Server (HSS), a macro base station 108, e.g., eNodeB 108, which is connected to the MVNO network core 110 via communications link 132 which is typically a wired communications link such as for example a high capacity wired cable or fiber optical cable. MVNO cell 130 illustrates the macro base station 108 wireless coverage area. While only one macro base station 108 is illustrated, it is to be understood that the MVNO network typically has numerous macro base stations. The Citizens Broadcast Radio Service Device (CBSD) 1 102 and Citizens Broadcast Radio Service Device (CBSD) 2 104 both include a subscriber identity module (SIM) card for wireless communication with the macro base station, eNodeB 108. CBSD 1 102 and CBSD 2 104 are both within the coverage area of eNodeB 108 as illustrated by MVNO cell 130. The MVNO network in this example is a Long Term Evolution (LTE) Evolved Packet Core Network which operates at a frequency spectrum different from the CBRS network frequency spectrum.

The exemplary CBRS network of system 100 includes Citizens Broadcast Radio Service Device (CBSD) 1 102, CBSD 2 104, Spectrum Access System device 106, and a plurality of user equipment (UE) devices UE 1 116, UE 2 118, UE 3 120, UE 4 122, UE 5 124. The CBSD 2 is connected to SAS 1 106 via communications link 140 and to the second operator network core 112 via communications link 129. Communications links 129 and 140 are wired communications links. The second operator is the same operator that operates CBSD 1 and CBSD 2 and is sometimes referred to as the CBSD operator with the second operator network core 112 sometimes being referred to as the CBSD operator network core.

The MVNO network core 110 includes a registrar 111. The CBSD operator network core 112 includes a registrar 114, e.g., Home Subscriber Server (HSS) and network services equipment 115. The system 100 also includes a video content server 142 which stores and provides content to users, e.g., user equipment devices, upon request. The video content server 142 is coupled to the CBSD operator network core 112 via communications link 143 which is typically a wired communications link.

CBRS cell 126 of the CBRS network illustrates the wireless coverage range of CBSD 1 102. CBSD 1 102 is a base station that provides wireless services to user equipment devices. The user equipment devices also sometimes referred to as user terminal devices UE 1 116, UE 2 118, and UE 3 120 are located in the cell 128. Communications links 141, 144, and 148 illustrate wireless communications channels, e.g., radio channels, over which CBSD 1 102 and UE 1 116, UE 2 118, and UE 3 120 communicate respectively. The user equipment devices UE 4 122 and UE 5 124 are located outside of the cell 126 and are not in communication with CBSD 1 102 as they are outside of the CBSD 1 coverage area.

CBRS cell 128 of the CBRS network illustrates the wireless coverage range of CBSD 2 104. CBSD 2 104 is a base station that provides wireless services to user equipment devices. The user equipment devices also sometimes referred to as user terminal devices UE 4 122 and UE 5 124 are located in the cell 128. Communications links 123 and 125 illustrate wireless communications channels, e.g., radio channels, over which CBSD 2 104 and UE 4 122 and UE 5 124 communicate respectively.

Both CBSD 1 102 and CBSD 2 104 are within the MVNO cell 130 and include SIM cards so that they appear to the MVNO network as user equipment devices which as mobile service subscribers that can receive services from the MVNO network. In this example, it should be noted that CBSD 1 102 does not have a wired connection to CBSD 2 104, SAS 1 106 or the CBSD operator network core 112 nor does it have any type of backhaul connection to the CBSD operator network core 112, SAS 1 106 or the MVNO network core 110.

The macro base station 108 in some embodiments is an LTE macro base station, e.g., eNodeB base station. The macro base station typically includes one or more receivers, transmitters, antennas and processors with the one or more processors controlling the operation of the macro base station.

While for the sake of simplicity in explaining the invention system 100 only illustrates two CBSDs and a few UE devices, it will be appreciated that system 100 typically includes numerous active CBSDs in the CBRS network supporting a plurality of UE devices.

Elements or steps with the same reference numbers used in different figures are the same or similar and those elements or steps will not be described in detail again.

Figure 2:
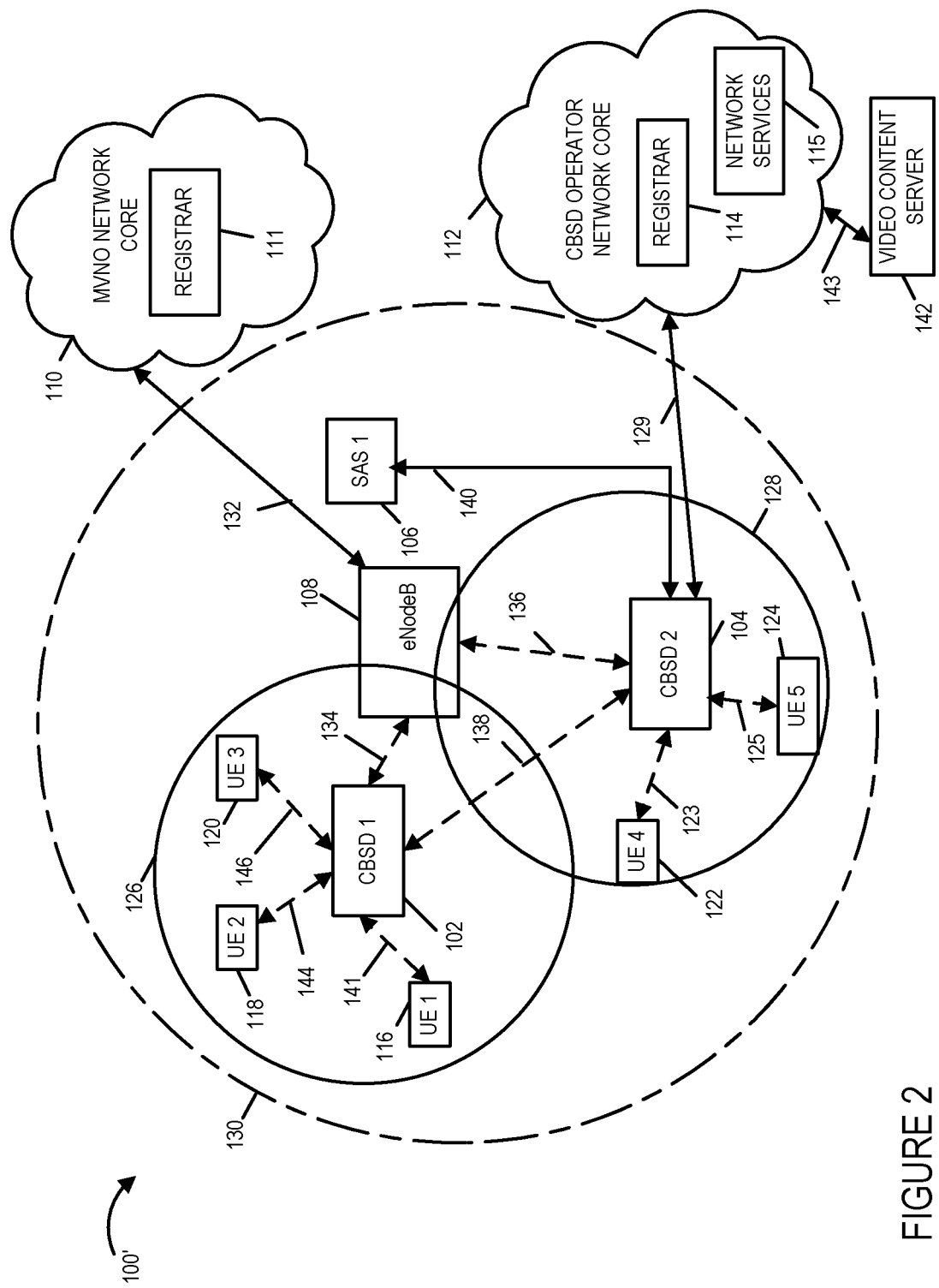
FIG. 2 illustrates the exemplary communications system of FIG. 1 with various additional connections between the devices shown such as a wireless device to device (D2D) communications link between the two illustrated Citizens Broadband Radio Services Devices and wireless communications links between the CBSDs and the macro base station of the MVNO network.

FIG. 2 diagram 100' illustrates communications system 100 with additional communications wireless links 134, 136 and 138. These wireless links 134, 136 and 138 are operated within a frequency spectrum or frequency band of the MVNO network. Communications link 134 couples CBSD 1 102 to macro base station eNodeB 108. Communications link 136 couples CBSD 2 104 to macro base station eNodeB 108. Communications link 138 is a device to device connection/communication link coupling CBSD 1 102 to CBSD 2 104. CBSD 1 102 communicates with macro base station 108 using wireless communications link 134, e.g., to register with the MVNO network via macro base station 108, request device to device resources, and to report device to device connection resource utilization. CBSD 2 104 uses wireless communication link 136 to communicate with the MVNO network via macro base station 108, e.g., to register with the MVNO network. CSD1 102 and CBSD 2 104 communicate with each via the device to device wireless communications link 138. CBSD 1 102 sends and receives messages to/from the SAS 1 106, CBSD operator network core via the device to device wireless communications link 138 and via the CBSD 2 104 backhaul connections to the SAS 1 106 and CBSD operator network core 112.

A brief overview of various aspects of one or more embodiments of the present invention will now be described in connection with FIGS. 1 and 2. As previously discussed, the invention addresses the problem of how CBSD without a backhaul connection to an operator's network core or the SAS can be operated to still provide network services to UE devices it is servicing. CBSD 1 102 and CBSD 2 104 each have a SIM card with an IMSI identification number and authentication credentials. CBSD 1 102 registers with the MVNO network using its SIM card. CBSD 1 102 uses the IMSI in its SIM card to register with the MVNO network as a UE mobile service subscriber. CBSD 2 104 also registers with the MVNO network using its SIM card. CBSD 104 uses the IMSI in its SIM card to register with the MVNO network as a UE mobile service subscriber. CBSD 1 102 uses the wireless link 134 to register with the MVNO network and CBSD 2 104 uses the wireless link 136 to register with the MVNO network. Both CBSD 1 102 and CBSD 2 104 appear to the macro base station 108 of the MVNO wireless network as UE mobile service subscribers. Wireless links 134 and 136 use frequency spectrum of the MVNO wireless network not CBRS network frequency spectrum.

The CBSD 104 also registers with the CBSD operator network core 112 establishing a backhaul connection between CBSD 2 104 and the CBSD operator network core 112.

CBSD 1 102 initiates a device to device communication connection with CBSD 2 104 since CBSD 1 102 does not have a backhaul connection. MVNO macro base station 108 which in this example is an eNodeB assigns required physical resource block (PRB) resources for the device to device connection between CBSD 1 102 and CBSD 2 104 in a response to a request for PRB resources from CBSD 1 102 as part of establishing the D2D connection between CBSD 1 102 and CBSD 2 104. CSD1 102 and CBSD 2 104 have MVNO frequency spectrum, e.g., LTE, transmitter and receiver. The D2D connection is established over wireless communication link 138 and uses MVNO frequency spectrum resources not CBRS frequency spectrum resources.

CBSD 1 102 and CBSD 2 104 each have a plurality of antennas and assign different groups of antennas for the D2D communication and for communications between the CBSDs and the UEs that are in the coverage area of the CBSDs. For example, if a CBSD has four antennas, its reserves 2 antennas for D2D communications and 2 antennas are reserved for communications with UEs in its coverage area.

Depending on the resource requirement for the D2D connection between CBSD 1 102 and CBSD 2 104, the amount of resources, e.g., PRB resources, assigned to the D2D by the macro base station may be increased or decreased. This will be determined by the D2D resource utilization percentage, e.g., PRB utilization percentage, as measured by CBSD 1 102 and reported to the MVNO base station 108. CBSD 1 102 and CBSD 2 104 will behave like UEs with IMSI number. Registration and authentication processes with the respect to the MVNO wireless network will be the same as if the CBSD 1 102 and CBSD 2 104 are mobile service subscriber UEs.

In some embodiments, the CBSD 2 104 will reserve a portion of its backhaul resources to be used solely for D2D communications with CBSD 1 102. The rest of CBSD 2

104's backhaul resources will be utilized for servicing UEs served by CBSD 2 104, e.g., UE 4 122 and UE 5 125 in the example of FIGS. 1 and 2. Reserved backhaul resources can change dynamically based on Quality of Service (QoS) requirements of the traffic type. In some embodiments, backhaul resources are reserved depending on the total downlink data tonnage per CBSD, or ither is more than one sector in a CBSD, the sum of all downlink data tonnage is calculated and used. In some embodiments, CBSD 1 102 will periodically generate and send "Backhaul Capacity Reservation" request messages to CBSD 2 104 over the D2D link to dynamically inform CBSD 2 104 of the optimum amount of backhaul capacity to reserve for CBSD 1 102. If CBSD 2 104 can reserve the capacity in its backhaul, CBSD 2 104 will generate and respond with a "Backhaul Capacity Reservation Accept Message" with the amount of backhaul capacity reserved for CBSD 1 102. Discussed below in connection with FIG. 3 is a more detailed exemplary of the signaling and steps which may be implemented in an exemplary embodiment of the present invention.

Figure 3B:
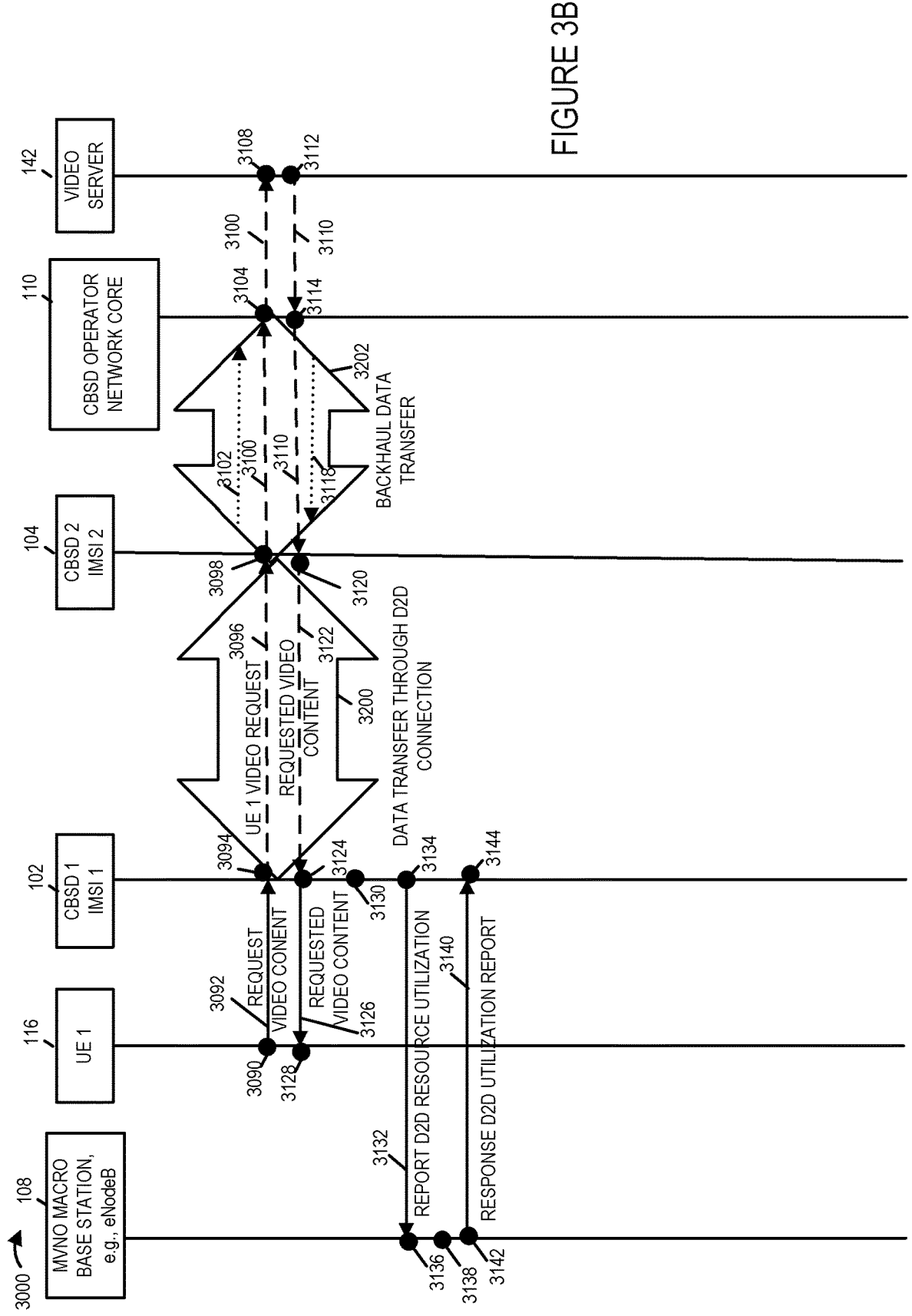
FIG. 3B illustrates a second part of an exemplary signaling diagram and method in accordance with an exemplary embodiment of the present invention.

FIG. 3 comprises FIGS. 3A and 3B. FIG. 3 illustrates the steps and associated signaling and data exchange between various entities/devices performed in an exemplary communications method in accordance with one exemplary embodiment of the present invention. FIG. 3A is a first part of the method steps and associated signaling and data exchange of FIG. 3. FIG. 3B is the second part of the method steps and associated signaling and data exchange of FIG. 3.

The exemplary method illustrated in diagram 3000 of FIG. 3 along with the signaling used to implement the method shows how a device to device wireless communications link can be established and utilized to provide a backhaul connection to a CBSD that does not have a backhaul connection. In FIG. 3, the exemplary method 3000 is implemented using exemplary system 100 and 100' of FIGS. 1 and 2 respectively. Elements or steps with the same reference numbers used in different figures are the same or similar and those elements or steps will not be described in detail again.

The method 3000 will now be explained in connection with the steps of the signaling diagram shown in FIG. 3. For explanatory purposes simplified signaling request and response messages are depicted with the messages and information contained therein illustrated which are most pertinent to explaining the present embodiment of the invention. As it will be appreciated additional information and formatting of the messages as well as the use of additional messages may be and typically are used in initiating and communicating among entities such for example initiating a device to device communications connection between two CBSDs, reserving resources for device to device communications, reserving backhaul capacity and obtaining video content by a UE from a video content server.

In start step 3002 illustrated on FIG. 3A, the communications method begins. Operation proceeds from start step 3002 to initialization step 3004.

In initialization step 3004. The system 100 is initialized with CBSD 1 102 and CBSD 2 104 powered up and activated.

CSBD 1 102 as shown in FIG. 1 is not connected to the CBSD 2 104, the CBSD Operator network core 112 or the MVNO network core 110. The CSBD 1 102 does not have a wired connection to SAS 1 106, CBSD 2 104, the CBSD operator network core 112, the MVNO network core 110, or the MVNO macro base station 108. The CBSD 1 102 as a result has no backhaul connection to either the MVNO network core or the CBSD operator network core. Nor is it connected to the SAS 1 106 of the CBRS network. In some embodiments, the CBSD 1 102 is implemented in accordance with exemplary CBSD 400 illustrated in FIG. 4. However, in some embodiments the CBSD 1 102 has no network interface, i.e., wired or optical interface such as interface 405 of exemplary CBSD 400. As there is no wired connection this reduces the cost of the CBSD 400. In some embodiments, the CBSD 1 102 includes a network interface, i.e. wired or optical interface 405 but no wired or fiber optical cable is connected to the network interface and/or the network interface is inoperable and/or the wire or fiber optic cable connected to the network interface has failed so that the CBSD 1 102 has no backhaul connection. The CBSD 1 102 has two wireless interfaces. The first wireless interface is operated to communicate using the licensed and assigned frequency spectrum and bandwidth of the CBRS system. The CBSD 1 102 communicates with the user equipment devices it provides services using the first wireless communications interface. The CBSD 1 102 second wireless interface is operated to communicate in the frequency spectrum and bandwidth of the MVNO network 110 so it can communicate with the macro base station (eNode B) 108 of the MVNO wireless network and with CBSD 2 104. The CBSD 1 102 has antennas assigned to communicate at the CBRS assigned frequency to communicate with CBRS user equipment devices in its coverage area which is cell 126. These antennas are part of the first wireless interface. The CBSD 1 102 also has antennas assigned to communicate at the MVNO network frequency to communicate with the macro base station eNodeB 108 and the CBSD 2 104. These antennas are included in the second wireless interface. In some embodiments, the CBSD 1 102 uses a single wireless interface with two groups or sets of antennas. The first group or set of antennas configured to communicate using the CBRS assigned frequency spectrum and the second group or set of antennas configured to communicate using the MVNO network frequency spectrum.

The CBSD 2 104 is implemented in accordance with the exemplary CBSD 400 illustrated in FIG. 4 and discussed in further detail below. The CBSD 2 104 has two wireless interfaces. The first wireless interface is operated to communicate using the licensed and assigned frequency spectrum and bandwidth of the CBRS system. CBSD 2 104 communicates with the user equipment devices it provides services using the first wireless communications interface. The CBSD 2 104 second wireless interface is operated to communicate in the frequency spectrum and bandwidth of the MVNO network 110 so it can communicate with the macro base station (eNode B) 108 of the MVNO wireless network and with CBSD 1 102. The CBSD 2 104 has antennas assigned to communicate at the CBRS assigned frequency to communicate with CBRS user equipment devices in its coverage area which is cell 128. These antennas are part of the first wireless interface. The CBSD 2 104 also has antennas assigned to communicate at the MVNO network frequency to communicate with the macro base station eNodeB 108 and the CBSD 1 102. These antennas are included in the second wireless interface. In some embodiments, the CBSD 2 104 uses a single wireless interface with two groups or sets of antennas. The first group or set of antennas configured to communicate using the CBRS assigned frequency spectrum and the second group or set of antennas configured to communicate using the MVNO network frequency spectrum. The CBSD 2 104 has one or more network interfaces that are coupled or connected to the SAS 1 106 and the CBSD operator network core 112. CBSD 2 104 is coupled or connected to SAS 1 106 via communications link 140 and CBSD 2 104 is coupled or connected to the CBSD operator network core 112 via communication link 128. Both CBSD 1 102 and CBSD 2 104 include a SIM card and appear to the MVNO Network as a user equipment device.

Operation proceeds from initialization step 3004 to step 3006. In step 3006, CBSD 1 102 generates a registration request message 3008 to register with the MVNO network using information contained in its SIM card, e.g., the international mobile subscriber identity (IMSI) referred to as IMSI 1 and authentication credentials. Operation proceeds from step 3006 to step 3010.

In step 3010, the CBSD 1 102 transmits the registration request message to the MVNO macro base station 108 using its second wireless interface and the antennas assigned to communicating with the MVNO network using the frequency spectrum of the MVNO network. The registration request message is transmitted over the wireless communication link 134. Operation proceeds from step 3010 to step 3012.

In step 3012, the MVNO macro base station, e.g., eNodeB, 108 receives and processes the registration request message to register the CBSD 1 102. The CBSD 1 102 appears to the MVNO macro base station as a user equipment device. In some embodiments, as part of registering the CBSD 1 102 with the MVNO network, the MVNO macro base station generates and sends a registration request message to the MVNO network core registrar 111 over wired communications link 132 which connects the macro base station 108 to the MVNO network core. The MVNO network core registrar may be, and in most embodiments is, a Home Subscriber Server (HSS). The HSS uses the information contained in the registration request, e.g., the CBSD 1 102 IMSI 1 and authentication credentials, to authenticate and register the CBSD 1 102 with the MVNO network. Operation proceeds step 3012 to step 3014.

In step 3014, the MVNO macro base station 108 generates a registration response message 3016. The registration response message is registration response message indicating successful authentication when the MVNO network was able to successfully register the CBSD 1 102. The registration response message indicates a registration failure when the MVNO network is unable to successfully authenticate and register the CBSD 1 102. In this example, the MVNO network is able to successfully register CBSD 1 102 and the registration response message contains information indicating successful registration. Operation proceeds from step 3014 to step 3018.

In step 3018, the MVNO macro base station 108 sends/transmits the registration response message to CBSD 1 102 via the wireless communication link 134 which is operated using the MVNO radio frequency spectrum. Operation proceeds from step 3018 to step 3020.

In step 3020, the CBSD 1 102 receives and processes, the registration response message which in this example indicates the successful registration of the CBSD 1 102 with the MVNO network. The CBSD 1 102 uses the wireless receiver of its second wireless interface to receive the registration response. The antennas assigned to the group to communicate with the MVNO network at the frequency spectrum of the MVNO network are used to receive the registration response message over the wireless communications link 134. At this time, the CBSD 1 102 is registered with the MVNO network and appears to the MVNO network as a user equipment device even though it is a non-mobile fixed CBSD device in the CBRS network. That is the CBSD device is a stationary device when in an active mode or operation. Operation proceeds from step 3020 to step 3022.

In step 3022, CBSD 2 104 generates a registration request message 3024 to register with the MVNO network using information contained in its SIM card, e.g., the international mobile subscriber identity (IMSI) referred to as IMSI 2 and authentication credentials. Operation proceeds from step 3022 to step 3026.

In step 3026, the CBSD 2 104 transmits the registration request message to the MVNO macro base station 108 using its second wireless interface and the antennas assigned to communicating with the MVNO network using the frequency spectrum of the MVNO network. The registration request message is transmitted over the wireless communication link 136 illustrated in FIG. 2. Operation proceeds from step 3026 to step 3028.

In step 3028, the MVNO macro base station, e.g., eNodeB, 108 receives and processes the registration request message to register the CBSD 2 104. The CBSD 2 104 appears to the MVNO macro base station as a user equipment device. In some embodiments, as part of registering the CBSD 2 104 with the MVNO network, the MVNO macro base station generates and sends a registration request message to the MVNO network core registrar 111 over wired communications link 132 which connects the macro base station 108 to the MVNO network core 110. The MVNO network core registrar 111 may be, and in most embodiments is, a Home Subscriber Server (HSS). The HSS uses the information contained in the registration request, e.g., the CBSD 2 104 IMSI 2 and authentication credentials, to authenticate and register the CBSD 2 104 with the MVNO network. Operation proceeds step 3028 to step 3030.

In step 3030, the MVNO macro base station 108 generates a registration response message 3032. The registration response message is a registration response message indicating successful authentication when the MVNO network is able to successfully register the CBSD 2 104. The registration response message indicates a registration failure when the MVNO network is unable to successfully authenticate and register the CBSD 2 104. In this example, the MVNO network is able to successfully register the CBSD 2 104 and the registration response message contains information indicating successful registration. Operation proceeds from step 3030 to step 3034.

In step 3034, the MVNO macro base station 108 sends the registration response message to CBSD 2 104 via the wireless communication link 136 illustrated in FIG. 2 which is operated using the MVNO radio frequency spectrum. Operation proceeds from step 3034 to step 3036.

In step 3036, the CBSD 2 104 receives and processes, the registration response message which in this example indicates the successful registration of the CBSD 2 104 with the MVNO network. The CBSD 2 104 uses the wireless receiver of the second wireless interface to receive the registration response. The antennas assigned to the group to communicate with the MVNO network at the frequency spectrum of the MVNO network are used to receive the registration response message over the wireless communications link 136. At this time, the CBSD 2 104 is registered with the MVNO network and appears to the MVNO network as a user equipment device even though it is a non-mobile fixed CBSD device in the CBRS network. Operation proceeds from step 3036 to step 3038.

In step 3038, CBSD 2 104 generates a registration request message 3040 for registering with the CBSD operator network core registrar 114. In some embodiments, the CBSD operator network core registrar 114 is a Home Subscriber Server. Operation proceeds from step 3038 to step 3042.

In step 3042, CBSD 2 104 transmits the registration request message 340 to the CBSD network registrar 114 in the CBSD operator network core 112 over communications link 128 via its network interface, e.g., network interface 405. Operation proceeds from step 3042 to step 3044.

In step 3044, the CBSD operator network core registrar 114 receives the CBSD 2 104 registration request message 3040 from CBSD 2 104. Operation proceeds from step 3044 to step 3046.

In step 3046, the CBSD operator network core registrar 114 processes the registration request message 3040 from CBSD 2 104 and successfully registers the CBSD 2 with the CBSD operator network core 112. Operation proceeds from step 3046 to step 3048.

In step 3048, the CBSD operator network core registrar 114 generates a registration request response message 350 indicating that CBSD 2 104 has been successfully registered with the CBSD operator network core 112. Operation proceeds from step 3048 to step 3052.

In step 3052, the CBSD operator network core registrar 114 transmits the registration request response message 3050 to CBSD 2 104 via communications link 129. Operation proceeds from step 3052 to step 3054.

In step 3054, the CBSD 2 104 receives the registration request response message 3050 indicating that CBSD 2 104 has been successfully registered with the CBSD operator network core 112. The registration response request message 350 is received by the CBSD 2 104 network interface via communication link 129. Operation proceeds from step 3054 to step 3056.

It is to be understood that the sequence of the registration of the CBSD 1 102 with the MVNO network, the CBSD 2 104 with the MVNO network and the CBSD 2 104 with the CBSD operator network core is only exemplary and that the order of the registrations is not important. The registrations may occur in a different order. It is also to be understood that the registrations may occur in parallel and need occur serially as shown.

In step 3056, the CBSD 1 102 initiates device to device (D2D) communications with CBSD 2 104 using the MVNO network frequency spectrum since CBSD 1 does not have a backhaul connection. CBSD 1 102 generates a request 3058 for resources, e.g., Physical Resource Block (PRB) resources, for a D2D connection with CBSD 2 104. Operation proceeds from step 3056 to step 3060.

In step 3060, CBSD 1 102 transmits using its second wireless interface to the MVNO macro base station 108 over wireless communications link 134 the request for resources for D2D message 3058. Operation proceeds from step 3060 to step 3062.

In step 3062, the MVNO macro base station 108, receives the request for resources for D2D communications message 3058. Operation proceeds from step 3062 to step 3064.

In step 3064, the MVNO macro base station 108 assigns required resources, e.g., PRB resources, for the device to device communications between CBSD 1 102 and CBSD 2 104 and generates a response to request for resources messages 3066 indicating that resources have been assigned and/or allocated in response to the request for resources 3058. In some embodiments, the response message 3066 includes information on the amount of resources, e.g., PRB resources, which have been assigned and/or allocated. Operation proceeds from step 364 to step 368.

In step 3068, MVNO macro base station 108 transmits the response to request for resources message 3066 to the CBSD 1 102 in response to the request message 358 over wireless communications link 134. Operation proceeds from step 3068 to step 3070.

In step 3070, the CBSD 1 102 receives the response to request for resources message 3066 over wireless communications link 134 using its second wireless interface. With the resources of the MVNO network for the device to device communications between CBSD 1 102 and CBSD 2 104 assigned, the CBSD 1 102 establishes the device to device wireless communications link or channel 138 between CBSD 1 102 and CBSD 2 104. Operation proceeds from step 3070 to step 3072.

In step 3072, CBSD 1 102 generates a backhaul capacity reservation request message 3074 in response to the receipt of response message 3066. In some embodiments, the backhaul capacity reservation request message 3074 includes the optimum and/or an estimated amount of backhaul capacity to reserve for CBSD 1 102. In some embodiments part of generating the backhaul capacity reservation requests including determining one or more of the following: the number of user equipment devices (UEs) which are to be serviced by CBSD 1 102, the UE category for each UE to be serviced, type of each UE to be serviced (phone, sensor, mobile device type, etc.), the UE traffic type for each of the UEs, each UE's data bearer, time indicator for when service is to be provided (time of day, day of week, busy hour, normal hours, work hours, weekend). The determined information may, and in some embodiments is, included in the backhaul capacity reservation request message 3074. Operation proceeds from step 3072 to step 3076.

In step 3076, the CBSD 1 102 transmits to CBSD 2 102 over the D2D communications link 138, the backhaul capacity reservation request message 3074. The CBSD 1 102 uses its second wireless interface to transmit the backhaul capacity reservation request message 3074. Operation proceeds from step 376 to step 3078.

In step 3078, the CBSD 2 104 receives the backhaul capacity reservation request message 3074 from CBSD 1 102 using its second wireless communications interface. Operation proceeds from step 3078 to step 3080.

In step 3080, CBSD 2 104 in response to receiving the backhaul capacity reservation request message, CBSD 2 104 determines the minimum amount of backhaul it can reserve for the CBSD 1 102 backhaul data. CBSD 2 104 generates a backhaul reservation response message 3082. In some embodiments, the backhaul reservation response message 3082 includes the amount of backhaul capacity reserved for CBSD 1 102. In some embodiments, the backhaul reservation response message 382, is a backhaul capacity reservation accept message with the amount of backhaul capacity reserved for CBSD 1 102. In some embodiments, the backhaul reservation response message 3082 is merely an acceptance message which indicates that the optimum amount of backhaul capacity requested by CBSD 1 102 included in the backhaul reservation request message is being reserved by CBSD 2 104 for CBSD 1 102 backhaul.

In some embodiments, CBSD 2 104 makes a determination of whether the minimum amount of backhaul capacity that can be reserved for CBSD 1 102 is over a specified limit which will allow the CBSD 1 102 to operate using the CBSD 1 102 to CBSD 2 104 device to device wireless communications link 138 for its backhaul communications with SAS 1 106 and the CBSD operator network core 112. When the determination is that the minimum amount of backhaul capacity that can be reserved is not above the threshold then the CBSD 2 104 generates a response message 3082 which does not accept or denies the backhaul reservation request.

When the determination is that the minimum backhaul capacity that can be reserved is above the threshold than the CBSD 2 104 generates a backhaul reservation response message 3082 accepting the CBSD 1 102 backhaul reservation request which includes the amount of backhaul capacity being reserved for CBSD 1 102. Operation proceeds from step 380 to step 3084.

In step 3084, CBSD 2 104 transmits to CBSD 1 102, the backhaul reservation response message 3082 using its second wireless interface over the device to device communications link 138. Operation proceeds from step 3084 to step 3086.

In step 386, CBSD 1 102 receives the backhaul reservation response message 3082 using its second wireless interface. In this example, the backhaul reservation response message 3082 is an acceptance message indicating the amount of backhaul capacity reserved by CBSD 2 104 for CBSD 1 102. The device to device communications link 138 is now established and actively used to transmit and receive signaling and data messages from CBSD 1 102 to the SAS 1 106 and to the CBSD operator network core via CBSD 2 104. Operation proceeds from step 3086 to step 3088.

In step 3088, the CBSD 1 102 uses the device to device communications link 138 to communicate to register with the CBSD operator network core registrar 112. Operation proceeds from step 3088 to step 3090 shown on FIG. 3B.

In step 3090, UE 1 116 generates and transmits a request for video content message 3092 to CBSD 1 102 over wireless communications link 141 using the CBRS frequency spectrum. Operation proceeds from step 3090 to step 3094.

In step 3094, CBSD 1 102 receives the video content request message 3092 from UE 1 116 using its first wireless interface which supports communications using the CBRS assigned frequency spectrum. In step 3094 in addition to receiving the video content request from UE 1 116, CBSD 1 102 generates a video content request message 3096 based on the received video content request message 3092 and transmits the video content request message 3096 to CBSD 2 104 over the device to device communications link 138. Operation proceeds from step 3094 to step 3098.

In step 3098, CBSD 2 104 receives and processes the video content request message 3096 from CBSD 1 102. CBSD 2 104 receives the video content request message 3096 using its second wireless interface which operates on the frequency spectrum of the MVNO network. In processing the received video content request message 3096, the CBSD 2 104 determines that the message is destined for the video content server 142 and is to be transmitted to the CBSD operator network core 112 to which the video content server 142 is connected via the wired communications link 128 using the backhaul capacity reserved for CBSD 1 102. CBSD 2 104 generates video content request message 3100 based on received video content request 3096 and transmits it to the video content server 142 via communications link 129 and CBSD operator core network 110. In step 3102, CBSD 2 104 also generates and transmits requests for services from the UEs it is serving in CBRS network cell 128 such as for example UE 4 and UE 5. These requests are represented as message 3102. These messages are transmitted using the backhaul capacity which was not reserved for CBSD 1 or using backhaul capacity that was reserved for CBSD 1 but is not currently being used by CBSD 1. Operation proceeds from step 3098 to step 3104.

In step 3104, one or more devices in the CBSD operator network core receives the request messages 3102 and 3100 from CBSD 2 104 and directs the messages to their destination e.g., the video content server 142 in the case video content message 3100 and the network services devices 115 in connection with request 3102. Operation proceeds from step 3104 to step 3108.

In step 3108, the video content server 142 receives the video content request message 3100 from the CBSD operator network core via communications link 143. In response to receiving the video content request message 3100, the video content server 142 generates and transmits video content message 3110 to CBSD operator network core devices which includes at least a portion of the requested video content. The CBSD operator network core devices, e.g., services gateway, then transmits video content message 3110 to CBSD 2 104 using the backhaul capacity reserved for CBSD 1 102. The CBSD operator network core network services device 115 generates and transmits a response message 3118 to the request for services message 3102. The responses messages are communicated over communications link 129. The response message 3118 is transmitted using backhaul resources which have not been reserved for CBSD 1 102 or resources which are not currently being used by CBSD 1 102. Operation proceeds to step 3120.

In step 3120, the CBSD 2 104 receives the response message 3110 and 3118. With respect to response message 3118, the CBSD 2 104 sends the response message to the UE device or devices which requested the service such as for example UE 4 122 or UE 5 124 via wireless communications links 123 and 125 respectively using its first wireless interface which communicates using CBRS network assigned frequency spectrum. With respect to response message 3110, the CBSD 2 104 generates requested video content response message 3122 based on the received video content response message 3110 and transmits the video content response message 3122 to CBSD 1 102 using the device to device wireless communications link 138. The message 3122 is transmitted using the second wireless interface of CBSD 2 104 which communicates using the frequency spectrum of the MVNO network. Operation proceeds from step 3120 to step 3124.

In step 3124, the CBSD 1 102 receives the requested video content message 3122 and generates requested video content message 3126 based on requested video content message 3122. In step 3124, CBSD 1 102 transmits the requested video content message 3122 to UE 1 116 via wireless communications link 141 using CBRS assigned spectrum. The CBSD 1 102 uses its first wireless interface to transmit the message 3126. Operation proceeds from step 3124 to step 3126.

In step 3126, UE 1 116 receives and processes the requested video content message 3126 extracting and displaying the requested video content on the display UE 1 116. In this way CBSD 1 102 has been able to deliver requested video content via the CBSD operator network core 112 to UE 1 116 by using the wireless device to device connection to the CBSD 2 104 and the backhaul capacity CBSD 1 102 reserved with CBSD 2 104. Arrow 3200 represents the data being transferred through device to device connection between CBSD 1 102 and CBSD 2 104 using the MVNO network frequency spectrum. Arrow 3202 represents the backhaul data being transferred between CBSD 2 104 and the CBSD operator network core 110. It includes both CBSD 1 102 and CBSD 2 104 backhaul data which is being transferred.

Steps 3130, 3134, 3136, 3138, 3142 and 3144 are optional and are implemented during the usage of the device to device connection to determine and adjust the resources assigned by the MVNO macro base station for utilization by the device to device connection between CBSD 1 102 and CBSD 2 104.

In step 3130, CBSD 1 102 measures the resource utilization of the device to device connection between CBSD 1 102 and CBSD 2 104, e.g., by determining the PRB utilization percentage of the device to device communications connection. In step 3130 the CBSD 1 102 also generates report D2D resource utilization message 3132 which includes the measured D2D resource utilization. Operation proceeds from step 3130 to step 3134.

In step 3134, the CBSD 1 102 transmits the report D2D resource utilization message 3132 to MVNO macro base station 108 using communications link 134. Operation proceeds from step 3134 to step 3136.

In step 3136, the MVNO macro base station 108 receives the report D2D resource utilization message 3132. Operation proceeds from step 3136 to step 3138.

In step 3138, MVNO macro base station 108 adjusts the amount of resources assigned to the D2D connection for example increasing or decreasing the amount of PRB assigned to the D2D based on the reported D2D resource utilization, e.g., PRB resource utilization percentage. The MVNO macro base station then may, and in some embodiments does, generate a response message 3140 to the D2D utilization report message indicating amount of resources assigned to the D2D connection or the change in the amount of resources assigned to the D2D connection. Operation proceeds from step 3138 to step 3142.

In step 3142, the MVNO macro base station 108, transmits over communications link 134 the response D2D utilization report message 3140 to CBSD 1 102. Operation proceeds from step 3142 to step 3144.

In step 3144, the CBSD 1 102 receives and processes the response D2D utilization report message 3140. Optional steps 3130, 3134, 3136, 3138, 3142 and 3144 are typically repeated while the D2D connection remains active so that the MVNO resources are not wasted and the D2D connection has the appropriate level of resources it requires. Also, in some embodiments, the CBSD 1 102 will generate and send backhaul capacity reservation messages to CBSD 2 104 to dynamically inform CBSD 2 104 of the optimum and/or estimated amount of backhaul capacity to reserve for CBSD 1 102. CBSD 2 104 will generate a response to the backhaul capacity reservation messages with a response message accepting or denying the request. When the request is accept the response message typically includes the amount of backhaul capacity reserved for CSBD 1 102 by CBSD 2 104.

Figure 4:
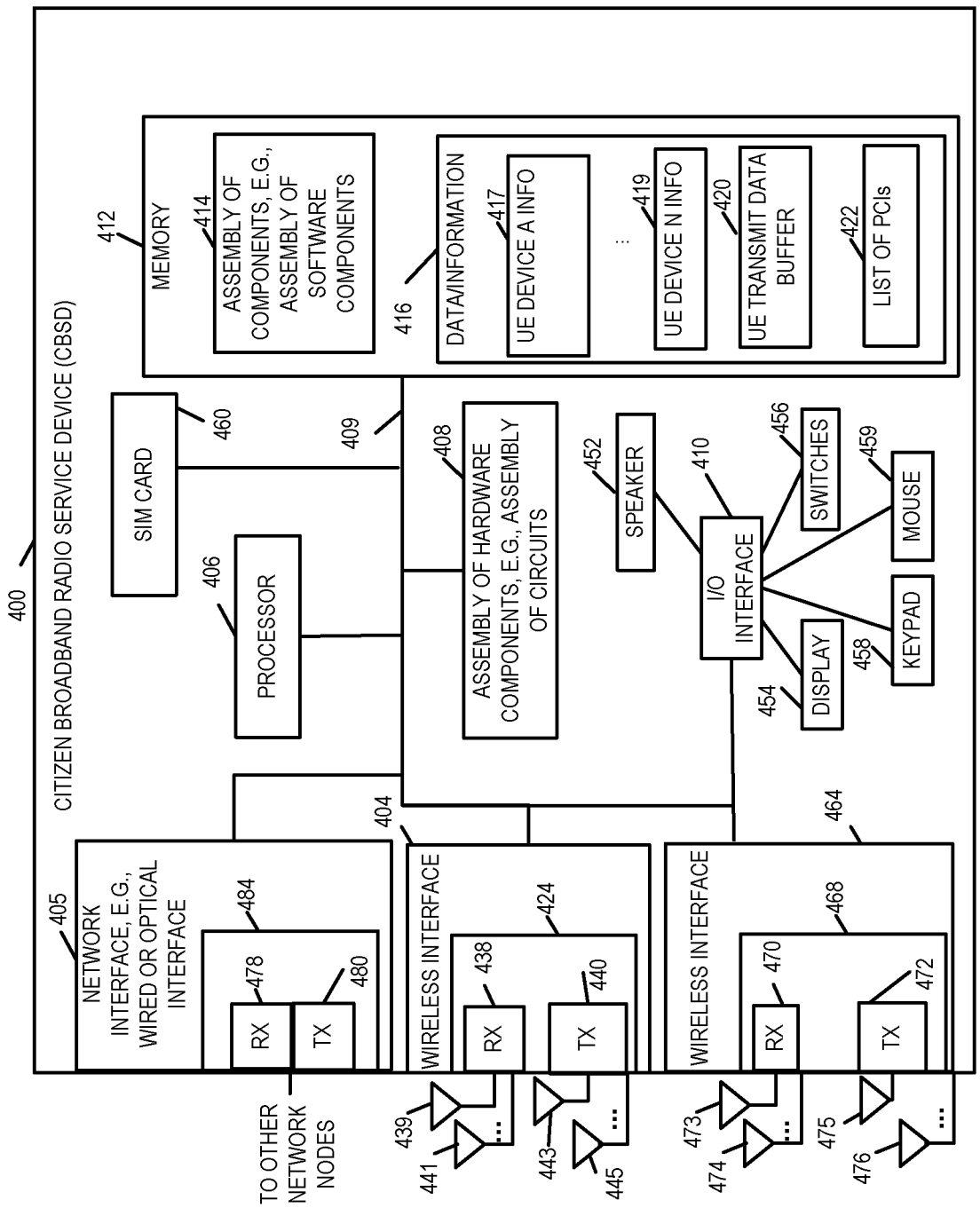
FIG. 4 illustrates details of an exemplary Citizens Broadband Radio Service Device (CBSD) in accordance with one embodiment of the present invention.

FIG. 4 is a drawing of an exemplary Citizens Broadband Radio Service Device (CBSD) 400 in accordance with an exemplary embodiment. The CBSD device 400 includes the capabilities of a CBSD as defined by the Federal Communications Commission's Rules with Regard to Commercial Operations in the 3550-3650 MHz Band. Exemplary CBSD device 400 includes a subscriber identification module (SIM) 460, also known as a SIM card, a first wireless interface 404, a second wireless interface 464, a network interface 405, e.g., a wired or optical interface, a processor 406, e.g., a CPU, an assembly of hardware components 408, e.g., an assembly of circuits, and I/O interface 410 and memory 412 coupled together via a bus 409 over which the various elements may interchange data and information. CBSD device 400 further includes a speaker 452, a display 453, switches 456, keypad 458 and mouse 459 coupled to I/O interface 410, via which the various I/O devices (452, 454, 456, 458, 459) may communicate with other elements (404, 406, 408, 412) of the CBSD device 400. Network interface 405 includes a receiver 478 and a transmitter 480. In some embodiments, receiver 478 and transmitter 480 are part of a transceiver 484. Wireless interface 404 includes a wireless receiver 438 and a wireless transmitter 440. In some embodiments, receiver 438 and transmitter 440 are part of a transceiver 424. In various embodiments, wireless interface 404 includes a plurality of wireless receivers and a plurality of wireless transmitters. Wireless receiver 438 is coupled to a plurality of receive antennas (receive antenna 1 439, . . . , receive antenna M 441), via which CBSD device 400 can receive wireless signal from other wireless communications devices including a second wireless communications device, e.g., a UE device. Wireless transmitter 440 is coupled to a plurality of wireless transmit antennas (transmit antenna 1 443, . . . , transmit antenna N 445) via which the CBSD 400 can transmit signals to other wireless communications devices including a second wireless communications device, e.g., a UE device.

Wireless interface 464 includes a wireless receiver 470 and a wireless transmitter 474. In some embodiments, receiver 470 and transmitter 472 are part of a transceiver 468. In various embodiments, wireless interface 464 includes a plurality of wireless receivers and a plurality of wireless transmitters. Wireless receiver 470 is coupled to a plurality of receive antennas (receive antenna 1 473, . . . , receive antenna M 474), via which CBSD device 400 can receive wireless signal from other wireless communications devices including a second wireless communications device, e.g., another CBSD device, a LTE macro base station (e.g., eNodeB), etc. Wireless transmitter 464 is coupled to a plurality of wireless transmit antennas (transmit antenna 1 475, . . . , transmit antenna N 476) via which the CBSD 400 can transmit signals to other wireless communications devices including a second wireless communications device, e.g., another CBSD device, a LTE macro base station (e.g., eNodeB), etc.

In some embodiments, the first wireless interface is assigned to service communications between the CBSD and user equipment devices in its coverage area while the second wireless interface is assigned to service device to device communications between the CBSD 400 and another CBSD. In some embodiments, only a single wireless interface is utilized. In such cases, the single wireless interface includes a plurality of antennas with at least one of plurality of antennas being assigned to a first group of antennas and at least one of the plurality of antennas being assigned to a second group of antennas. The first group of antennas being used or reserved to provide communications between the CBSD 400 and the UEs in its coverage areas and second group of antennas being used or reserved to be used for providing device to device communications.

Memory 412 includes an assembly of component 414, e.g., an assembly of software components, and data/information 416. Data/information 416 includes UE device information corresponding to a plurality of user equipment devices (UE device A information 417, . . . , UE device N information 419 where A to N are the UE devices being serviced by the CBSD for example CBSD 1 102 services UE 1 . . . UE 3 as shown in FIG. 1. Data/information 416 may also include device to device configuration information, estimated and/or backhaul capacity requirements information, estimated D2D resource requirements information, measured D2D resource utilization information and reports.

The SIM card 460 is an integrated circuit that securely stores an international mobile subscriber identity (IMSI) number and its related key, which are used to identify and authenticate the CBSD. Through the use of the SIM card 460 the CBSD appears as a mobile user equipment device (UE) to a Mobile Virtual Network Operator (MVNO) network. CBSD 1 102 and CBSD 2 104 of FIGS. 1, 2, and 3 may be, and in some embodiments are, implemented in accordance with CBSD 400. In some embodiments, CBSD 1 102 which does not have a backhaul connection does not include a network interface or in some embodiments the network interface is not connection to a communications link.

Figure 5:
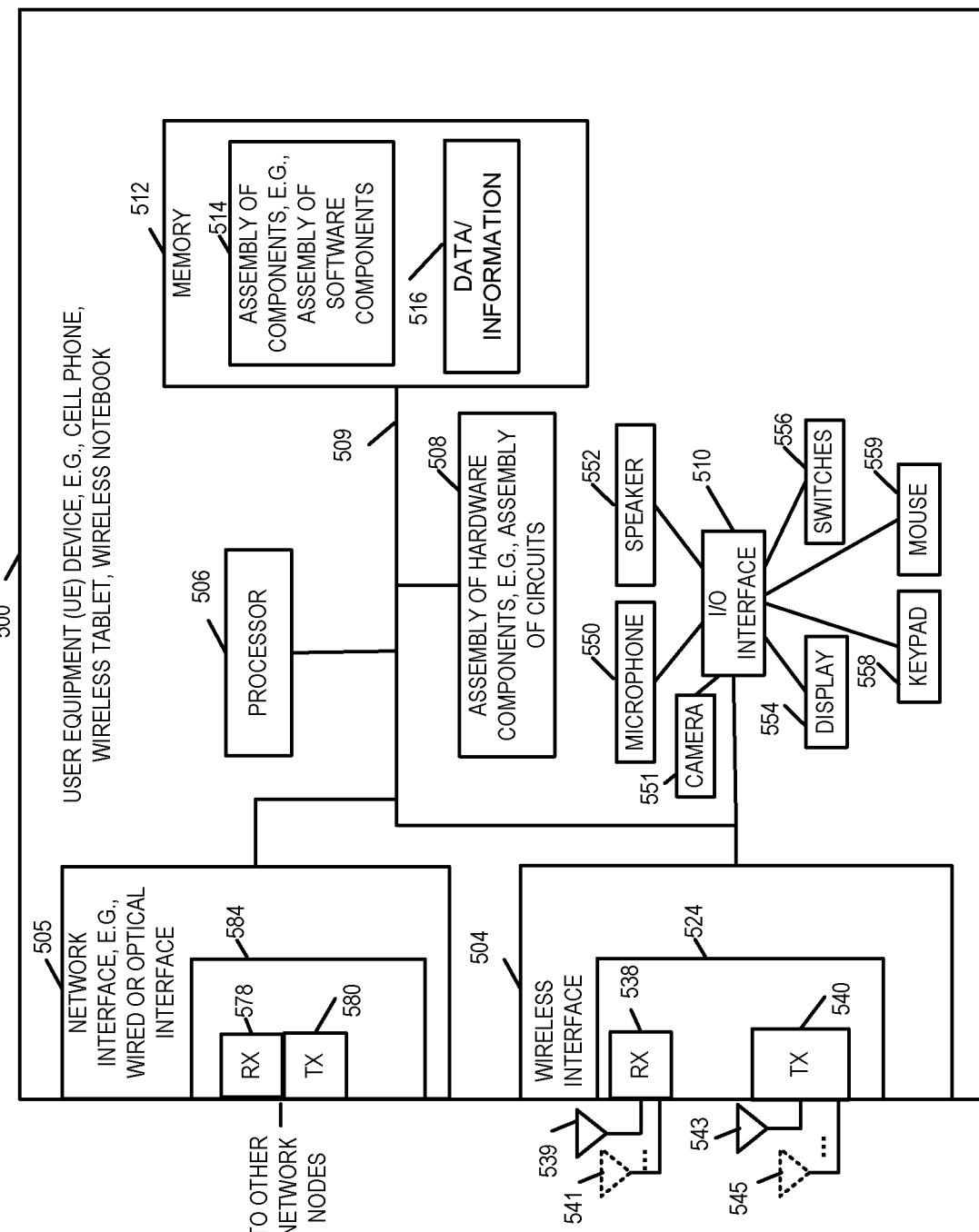
FIG. 5 illustrates details of an exemplary User Equipment (UE) device in accordance with one embodiment of the present invention.

FIG. 5 is a drawing of an exemplary user equipment (UE) device 500 in accordance with an exemplary embodiment. UE device 500 is, e.g., a mobile device such as a cell phone, a smart phone, wireless tablet or wireless notebook. UE device 500, in some embodiments, includes Long Term Evolution (LTE), e.g., 4 G LTE, mobile device capabilities. Exemplary UE device 500 includes a wireless interface 504, a processor 506, e.g., a CPU, an assembly of hardware components 508, e.g., an assembly of circuits, and I/O interface 510 and memory 512 coupled together via a bus 509 over which the various elements may interchange data and information. UE device 500 further includes a microphone 550, camera 551, speaker 552, a display 553, e.g., a touch screen display, switches 556, keypad 558 and mouse 559 coupled to I/O interface 510, via which the various I/O devices (550, 551, 552, 554, 556, 558, 559) may communicate with other elements (504, 506, 508, 512) of the UE device. Network interface 505 includes a receiver 578 and a transmitter 580. In some embodiments, receiver 578 and transmitter 580 are part of a transceiver 584. Wireless interface 504 includes a wireless receiver 538 and a wireless transmitter 540. In some embodiments, receiver 538 and transmitter 540 are part of a transceiver 524. In various embodiments, wireless interface 504 includes a plurality of wireless receivers and a plurality of wireless transmitters. Wireless receiver 538 is coupled to one or more receive antennas (receive antenna 1 539, . . . , receive antenna M 541), via which UE device 500 can receive wireless signals from other wireless communications devices including, e.g., a CBSD device such as CBSD 400. Wireless transmitter 540 is coupled to one or more wireless transmit antennas (transmit antenna 1 543, . . . , transmit antenna N 545) via which the UE device 500 can transmit signals to other wireless communications device including a first wireless communications device, e.g., a CBSD 400. Memory 512 includes an assembly of components 514, e.g., an assembly of software components, and data/information 516.

Figure 6:
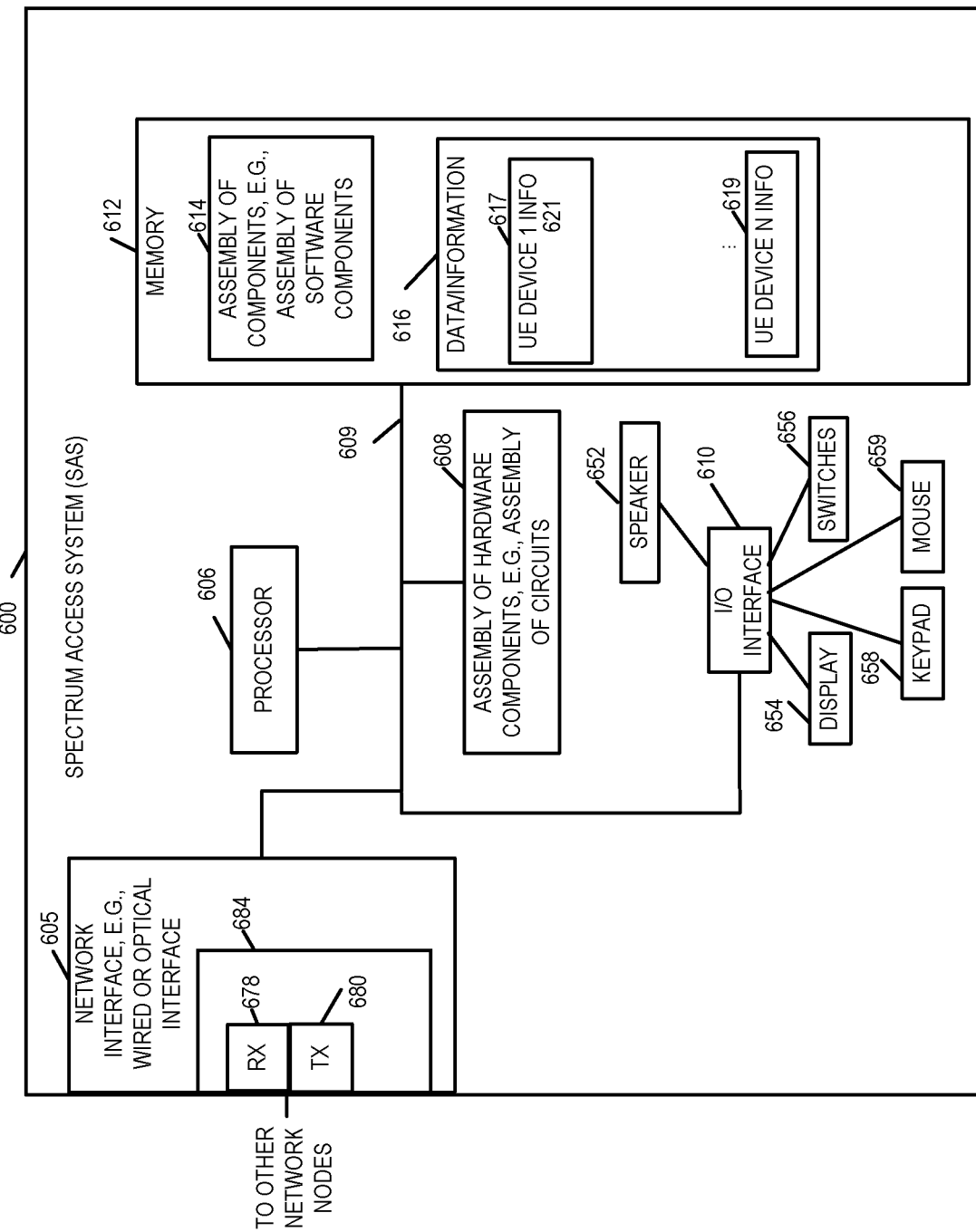
FIG. 6 illustrates details of an exemplary Spectrum Access System (SAS) in accordance with one embodiment of the present invention.

FIG. 6 is a drawing of an exemplary Spectrum Access System (SAS) device 600 in accordance with an exemplary embodiment. The SAS 600 includes the capabilities of a SAS as defined by the Federal Communications Commission's Rules with Regard to Commercial Operations in the 3550-3650 MHz Band. Exemplary SAS device 600 includes a network interface 605, e.g., a wired or optical interface, a processor 606, e.g., a CPU, an assembly of hardware components 608, e.g., an assembly of circuits, and I/O interface 610 and memory 612 coupled together via a bus 609 over which the various elements may interchange data and information. SAS 600 further includes a speaker 652, a display 653, switches 656, keypad 658 and mouse 659 coupled to I/O interface 610, via which the various I/O devices (652, 654, 656, 658, 659) may communicate with other elements (606, 608, 612) of the SAS 600. Network interface 605 includes a receiver 678 and a transmitter 680. The network interface 605 is typically used to communicate with other SAS devices and CBSD devices. In some embodiments, receiver 678 and transmitter 680 are part of a transceiver 684. Memory 612 includes an assembly of component 614, e.g., an assembly of software components, and data/information 616. Data/information 616 includes CBSD device information corresponding to a plurality of CBSD devices (CBSD device 1 102 information, . . . , CBSD device 2 104 information). In some embodiments, SAS 1 106 is implemented in accordance with SAS 600.

Figure 7:
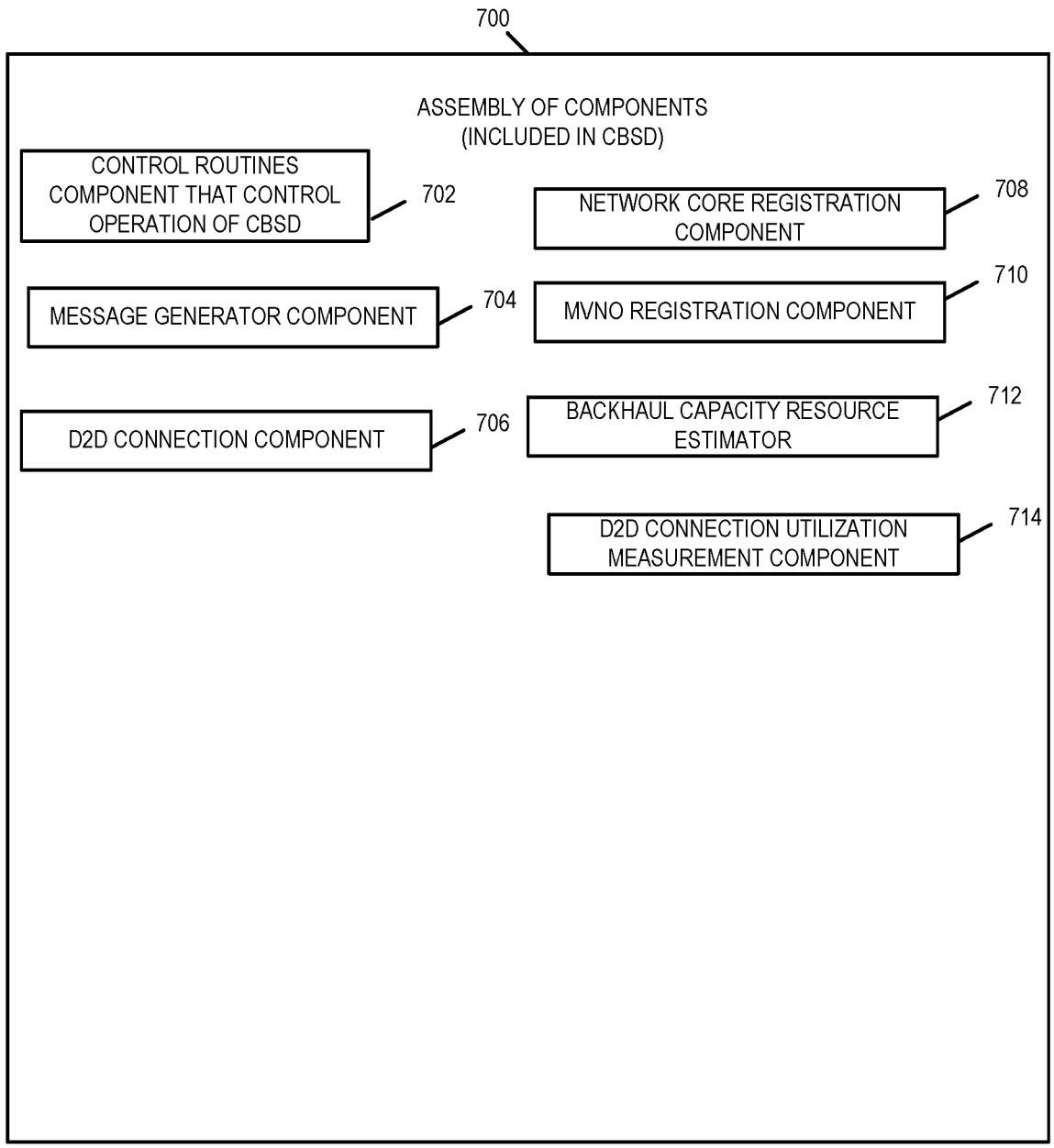
FIG. 7 illustrates an exemplary assembly of components for a CBSD in accordance with an embodiment of the present invention.

FIG. 7 is a drawing of an exemplary assembly of components 700 which may be included in an exemplary CBSD device, e.g., exemplary CBSD 400 of FIG. 4, in accordance with an exemplary embodiment. The components in the assembly of components 700 can, and in some embodiments are, implemented fully in hardware within a processor, e.g., processor 406, e.g., as individual circuits. The components in the assembly of components 700 can, and in some embodiments are, implemented fully in hardware within the assembly of hardware components 408, e.g., as individual circuits corresponding to the different components. In other embodiments some of the components are implemented, e.g., as circuits, within processor 406 with other components being implemented, e.g., as circuits within assembly of components 408, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 412 of the CBSD device 400, with the components controlling operation of CBSD device 400 to implement the functions corresponding to the components when the components are executed by a processor e.g., processor 406. In some such embodiments, the assembly of components 700 is included in the memory 412 as assembly of software components 414. In still other embodiments, various components in assembly of components 700 are implemented as a combination of hardware and software, e.g., with another circuit external to the processor providing input to the processor which then under software control operates to perform a portion of a component's function.

When implemented in software the components include code, which when executed by a processor, e.g., processor 406, configure the processor to implement the function corresponding to the component. In embodiments where the assembly of components 700 is stored in the memory 412, the memory 412 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the CBSD device 400 or elements therein such as the processor 406, to perform the functions of corresponding steps illustrated and/or described in the method of one or more of the flowcharts, signaling diagrams and/or described with respect to any of the Figures. Thus the assembly of components 700 includes various components that perform functions of corresponding one or more described and/or illustrated steps of an exemplary method.

Assembly of components 700 includes a control routines component 702, message generator component 704, device to device connection component 706, network core registration component 708, MVNO registration component 710, backhaul capacity resource estimator component 712, D2D resource utilization component 714.

The control routines component 702 is configured to control operation of the CBSD. The message generator component 704 is configured to generate messages for transmission to other devices including requests, response and report messages, e.g., registration request messages, backhaul reservation request messages, resource request messages, device to device setup, connection and teardown message, backhaul reservation response messages, D2D resource utilization report messages, command messages to be sent to UE, messages to be sent to SAS.

The device to device connection component 706 controls the CBSD to establish, maintain, and tear down device to device connections such as the device to device connection between CBSD 1 102 and CBSD 2 104. The network core registration component 708 registers the CBSD with the CBSD operator network core. MVNO registration component 710 registers the CBSD with the MVNO network, e.g., via a macro base station, e.g., eNode B, using SIM card information. The backhaul capacity resource estimator component 712 estimates the amount of backhaul to be reserved by a CBSD that is utilizing a second CBSD's backhaul to communication with a service provider. D2D resource utilization measurement component 714 measures the amount of resources being utilized by the D2D connection, e.g., by measuring and/or determining the D2D PRB utilization percentage.

Figure 8:
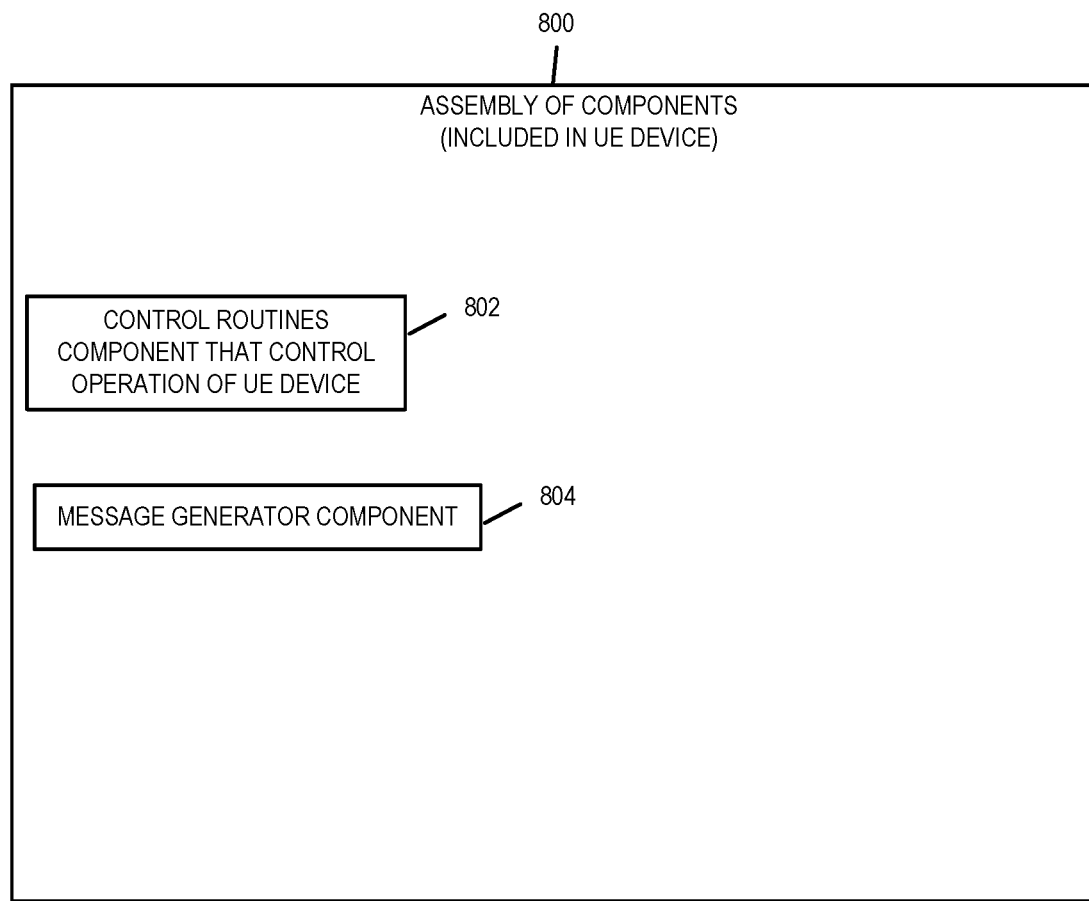
FIG. 8 illustrates an exemplary assembly of components for a user equipment device in accordance with an embodiment of the present invention.

FIG. 8 is a drawing of an exemplary assembly of components 800 which may be included in an exemplary user equipment (UE) device, e.g., UE device 500 of FIG. 5, in accordance with an exemplary embodiment. The components in the assembly of components 800 can, and in some embodiments are, implemented fully in hardware within a processor, e.g., processor 506, e.g., as individual circuits. The components in the assembly of components 800 can, and in some embodiments are, implemented fully in hardware within the assembly of hardware components 508, e.g., as individual circuits corresponding to the different components. In other embodiments some of the components are implemented, e.g., as circuits, within processor 506 with other components being implemented, e.g., as circuits within assembly of components 508, external to and coupled to the processor 506. As should be appreciated the level of integration of components on the processor and/or with some components being external to the processor may be one of design choice. Alternatively, rather than being implemented as circuits, all or some of the components may be implemented in software and stored in the memory 512 of the UE device 500, with the components controlling operation of UE device 500 to implement the functions corresponding to the components when the components are executed by a processor e.g., processor 506. In some such embodiments, the assembly of components 800 is included in the memory 512 as assembly of software components 514. In still other embodiments, various components in assembly of components 800 are implemented as a combination of hardware and software, e.g., with another circuit external to the processor providing input to the processor which then under software control operates to perform a portion of a component's function. When implemented in software the components include code, which when executed by a processor, e.g., processor 506, configure the processor to implement the function corresponding to the component. In embodiments where the assembly of components 800 is stored in the memory 512, the memory 512 is a computer program product comprising a computer readable medium comprising code, e.g., individual code for each component, for causing at least one computer, e.g., processor 506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the UE device 500 or elements therein such as the processor 506, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method.

Assembly of components 800 includes a control routines component 802 and a message generator component 804. The control routines component 802 is configured to control operation of the UE. The message generator component 804 is configured to generate messages for transmission to CBSD devices, e.g. session connection requests, service requests such as for example video content service requests, etc.

Figure 9:
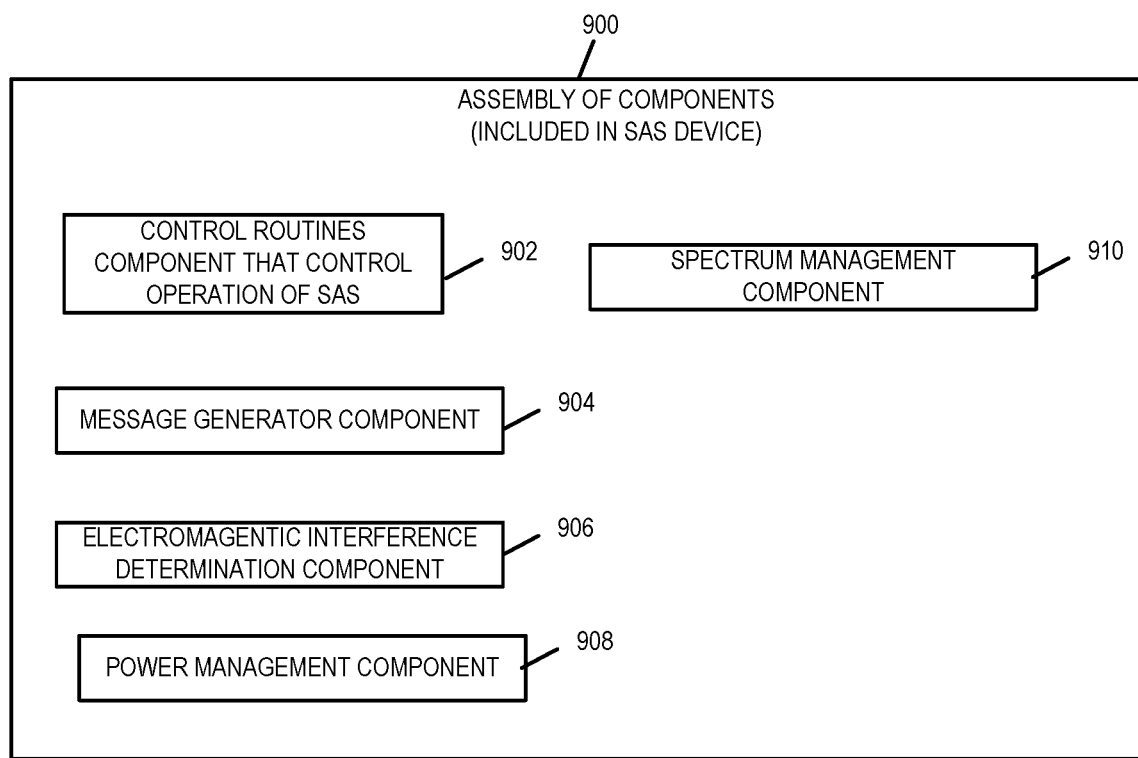
FIG. 9 illustrates an exemplary assembly of components for a SAS device in accordance with an embodiment of the present invention.

FIG. 9 is a drawing of an exemplary assembly of components 900 which may be included in an exemplary SAS device, e.g., exemplary SAS 600 of FIG. 6, in accordance with an exemplary embodiment. The components in the assembly of components 900 can, and in some embodiments are, implemented fully in hardware within a processor, e.g., processor 606, e.g., as individual circuits. The components in the assembly of components 900 can, and in some embodiments are, implemented fully in hardware within the assembly of hardware components 608, e.g., as individual circuits corresponding to the different components. In other embodiments some of the components are implemented, e.g., as circuits, within processor 606 with other components being implemented, e.g., as circuits within assembly of components 608, external to and coupled to the processor 606. As should be appreciated the level of integration of components on the processor and/or with some components being external to the processor may be one of design choice. Alternatively, rather than being implemented as circuits, all or some of the components may be implemented in software and stored in the memory 612 of the SAS 600, with the components controlling operation of SAS 600 to implement the functions corresponding to the components when the components are executed by a processor e.g., processor 606. In some such embodiments, the assembly of components 900 is included in the memory 612 as assembly of software components 614. In still other embodiments, various components in assembly of components 900 are implemented as a combination of hardware and software, e.g., with another circuit external to the processor providing input to the processor which then under software control operates to perform a portion of a component's function.

When implemented in software the components include code, which when executed by a processor, e.g., processor 606, configure the processor to implement the function corresponding to the component. In embodiments where the assembly of components 900 is stored in the memory 612, the memory 612 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the SAS 600 or elements therein such as the processor 606, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method.

Assembly of components 900 includes a control routines component 902, a message generator component 904, an electromagnetic interference determination component 906, and a power determination for active CBSD component. The control routines component 902 is configured to control operation of the SAS. The message generator component 904 is configured to generate messages for transmission to CBSD devices, e.g., power down instruction messages. The electromagnetic interference determination component is configured to determine actual or potential electromagnetic interference to be caused by wireless, e.g., radio transmission from active CBSD devices or CBSDs devices which are to become active. The power management component 908 is configured to manage power transmission levels to maximize usage of spectrum while minimizing interference. The power management component 908 determines the power transmission level reductions for CBSDs when a new CBSD is activated and added to the CBRS network. The spectrum management component 910 is configured to manage the allocation of frequency spectrum in the CBRS network.

Figures 10, 10A:
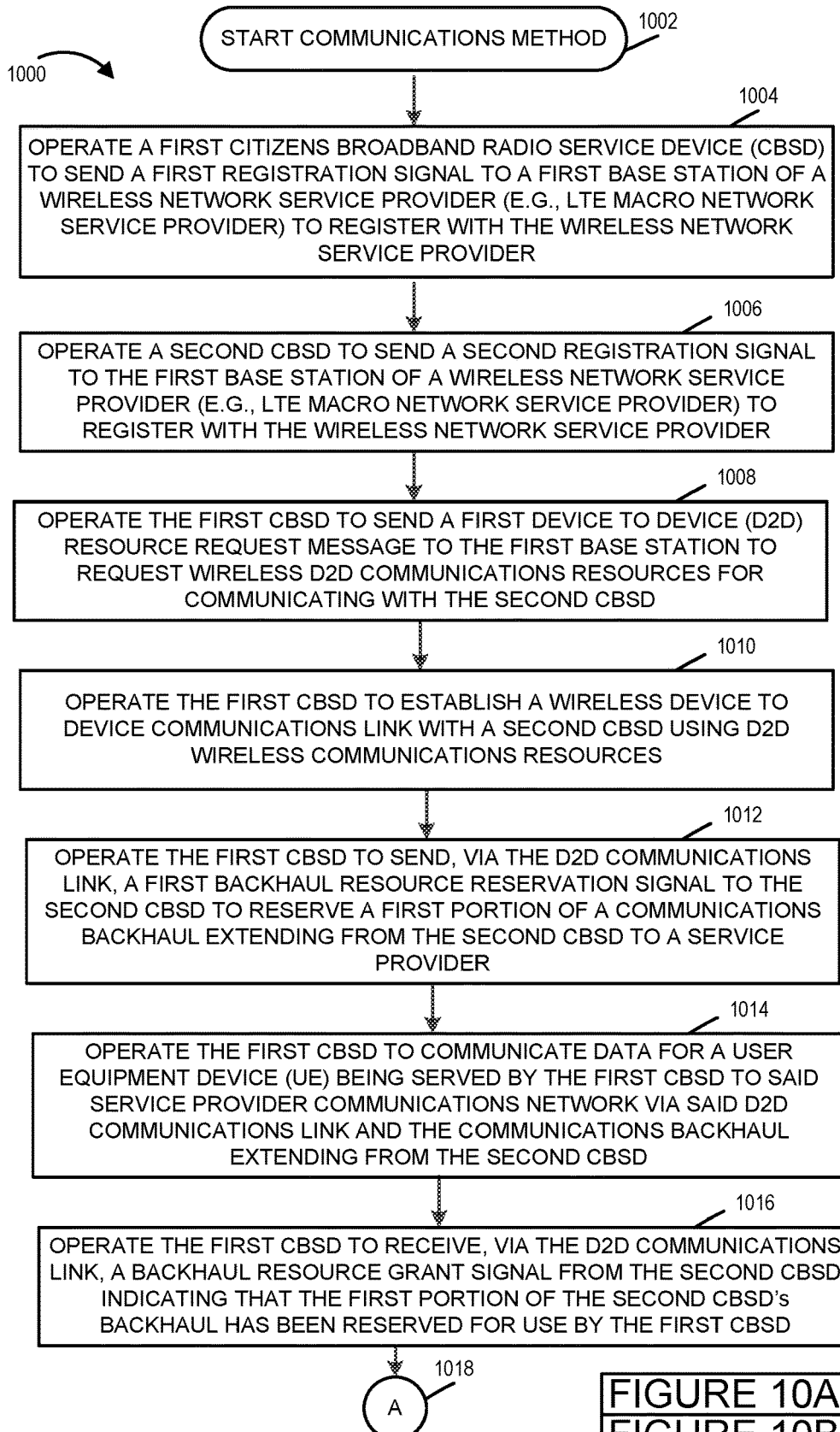
FIG. 10 illustrates the combination of FIGS. 10A and 10B.
FIG. 10A illustrates the steps of the first part of an exemplary communications method in accordance with one embodiment of the present invention.
Figure 10B:
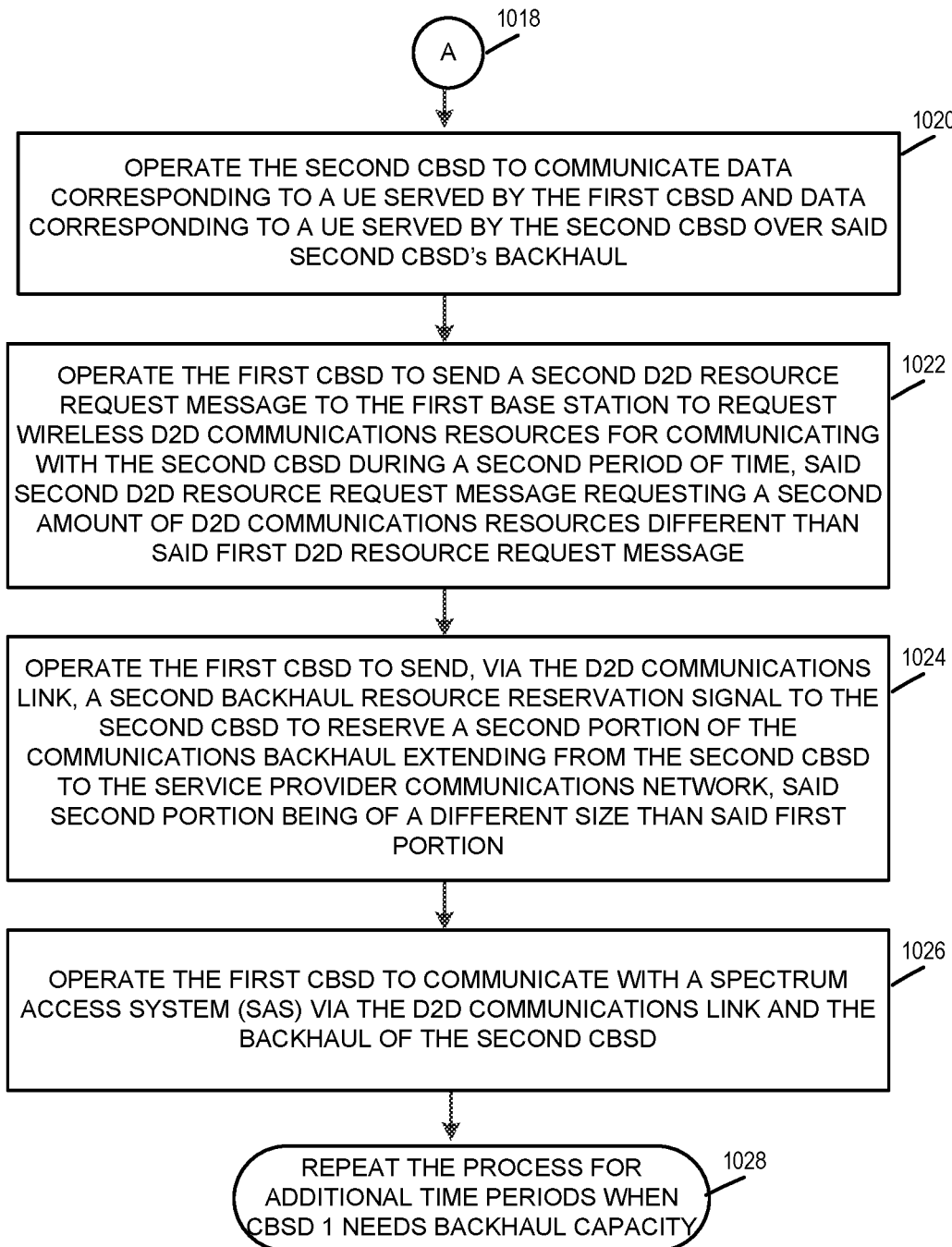
FIG. 10B illustrates the steps of the second part of an exemplary communications method in accordance with one embodiment of the present invention.

FIG. 10, which comprises the combination of FIGS. 10A and 10B illustrates an exemplary communications method 1000 including steps of a method operating a first CBSD and steps of operating a second CBSD. FIG. 10A illustrates the steps of the first part of the exemplary method 1000 in accordance with one embodiment of the present invention. FIG. 10B illustrates the steps of the second part of the exemplary method 1000 in accordance with one embodiment of the present invention.

For explanatory purposes the exemplary method 1000 will be explained in connection with the exemplary communications system 100 and 100' illustrated in FIGS. 1 and 2 although it should be understand that the method may be implemented using other systems and other system configurations then those illustrated in FIGS. 1 and 2.

The method 1000 shown in FIG. 10 will now be discussed in detail. The method starts in start step 1002 shown on FIG. 10A with the devices in system 100 being initialized and becoming operational. Operation proceeds from step 1002 to step 1004.

In step 1004, a first Citizens Broadband Radio Service Device (CBSD), e.g., CBSD 1 102 is operated to send a first registration signal to a first base station of a wireless network service provider e.g., LTE marco network service provider, to register with the wireless network service provider. The first registration signal may be, and in most embodiments is, a signal to register the first CBSD as a mobile service subscriber in the wireless network of the wireless network service provider. Operation proceeds from step 1004 to step 1006.

In step 1006, a second CBSD, e.g., CBSD 2 104, is operated to send a second registration signal to the base station, e.g., eNodeB base station 108) of the wireless network service provider, e.g., LTE marco network service provider, to register with the wireless network service provider. The second registration signal may be, and in most embodiments is, a signal to register the second CBSD as a mobile service subscriber in the wireless network of wireless network service provider. In the exemplary embodiment, the first and second CBSDs each include a Subscriber Identity Module (SIM) card, the first CBSD appearing as a first UE to the wireless network and the second CBSD appearing as a second UE to the wireless network. The first and second registration signals including information included in the SIM card included in the first and second CBSDs respectively. The SIM card information including an IMSI identifier and/or authentication credentials. In this way, the CBSDs use their respective SIM cards to register with the wireless network service provider and to appear as UEs to the wireless network service provider. Operation proceeds from step 1006 to step 1008.

In step 1008, the first CBSD is operated to send a first D2D resource request message to the first base station to request wireless D2D communications resources for communicating with the second CBSD. In various embodiments, the first D2D resource request message requests a first amount of wireless D2D communications resources, said first amount of wireless D2D communications resources being based on an expected amount of data to be transmitted over the backhaul of the second CBSD on behalf of user equipment devices serviced by the first CBSD during a first period of time. Operation proceeds from step 1008 to step 1010.

In step 1010, the first CBSD is operated to establish a wireless device to device (D2D) communications link with the second CBSD using D2D wireless communications resources. Operations proceed from step 1010 to step 1012.

In step 1012, the first CBSD is operated to send, via the D2D communications link, a first backhaul resource reservation signal to the second CBSD to reserve a first portion of a communications backhaul extending from the second CBSD to a service provider communication network. Operation proceeds from step 1012 to step 1014.

In step 1014, the first CBSD is operated to communicate data for a user equipment device (UE) being served by the first CBSD to said service provider communications network via said D2D communications link and the communications backhaul extending from the second CBSD. Operations proceed from step 1014 to step 1016.

In step 1016, the first CBSD is operated to receive, via the D2D communications link, a backhaul resource grant signal from the second CBSD indicating that the first portion of the second CBSD's backhaul has been reserved for use by first CBSD. Operation proceeds from step 1016 via connection node A 1018 to step 1020 shown on FIG. 10B.

In step 1020, the second CBSD is operated to communicate data corresponding to a UE served by the first CBSD and data corresponding to a UE served by the second CBSD over said second CBSD's backhaul. Operation proceeds from step 1020 to step 1022.

In step 1022, the first CBSD is operated to send a second D2D resource request message to the first base station to request wireless D2D communications resources for communicating with the second CBSD during a second period of time, said second D2D resource request message requesting a second amount of D2D communications resources different than said first D2D resource request message. Operation proceeds from step 1022 to step 1024.

In step 1024, the first CBSD is operated to send, via the D2D communications link, a second backhaul resource reservation signal to the second CBSD to reserve a second portion of the communications backhaul extending from the second CBSD to the service provider communication network, said second portion being of a different size than said first portion. Operation proceeds from step 1024 to step 1026.

In step 1026 the first CBSD is operated to communicate with a Spectrum Access System (SAS), e.g., SAS 1 106, via the D2D communications link and the backhaul of the second CBSD. Operation proceeds from step 1026 to step 1028.

In step 1028, the process is repeated for additional time period when CBSD 1 needs backhaul capacity that is to be provided by CBSD 2.

Various additional features and/or aspects of the invention will now be discussed. One or more of the various features and/or aspects of the invention may be included in various embodiments of the invention.

The wireless network with which the first CBSD and second CBSD register may be, and in the exemplary embodiment is, an LTE wireless network and the D2D communications link that is established between the first CBSD and the second CBSD is an LTE D2D communications link. The first CBSD does not have a wired backhaul connection to the service provider network or the wireless service provider network. In some embodiments, CBSD 1 has a wired backhaul connection but the wireless backhaul connection has failed.

In some embodiments of the exemplary method 1000 discussed above, the first CBSD includes a first set of antennas and a second set of antennas. The method 1000 further includes using the first set of antennas to receive and transmit signals to the base station, e.g., base station 108, of the wireless network service provider and to the second CBSD and using the second set of antennas for communications with user equipment devices served by the first CBSD such as for example UE 1 116, UE 2 118 and UE 3 120.

In some embodiments of the exemplary method 1000, the first CBSD communicates with the second CBSD using a first frequency band and the first CBSD communicates with user equipment devices served by the first CBSD using a second frequency band which is different from the first frequency band. Additionally, the first frequency band may be, and typically is, a licensed frequency band used by a macro base station operator and the first base station is a macro base station.

In some embodiments, the second CBSD similar to the first CBSD includes a first set of antennas and a second set of antennas. The second CBSD uses the first set of antennas to receive and transmit signals to the base station of the wireless network service provider and to the first CBSD and uses the second set of antennas for communications with user equipment devices served by the second CBSD, e.g., UE 4 122 and UE 5 125. The second CBSD communicates with the first CBSD using the first frequency band and the second CBSD communicates with user equipment devices served by the second CBSD using a third frequency band which is different from the first frequency band and in some embodiments is also different than the second frequency band. In some embodiments, the first frequency band is determined by the base station, e.g., base station 108.

In various embodiments, the first base station is an LTE base station and the D2D communications link is an LTE D2D communications link which uses one or more physical resource blocks (PRBs) allocated by the first base station for the D2D communications link between the first CBSD and the second CBSD.

In some embodiments, the second amount of D2D communications resources requested in the second D2D resource request message in step 1024 and the second portion of the communications backhaul requested by the second backhaul resource reservation signal in step 1026 are based upon an expected amount of traffic to be communicated over the backhaul of the second CBSD for user equipment devices served by the first CBSD during the second period of time. In some embodiments, the second D2D resource request message includes a D2D resource utilization measurement, e.g., PRB resource utilization percentage, measured by the first CBSD. In some embodiments, the second portion of the communications backhaul requested by the second backhaul resource reservation signal is based on expected amount of resources required based on one or more of the following: number of UEs to be serviced by the first CBSD, category of each of the UEs to be serviced by the first CBSD, the type of traffic, the types of UEs to be serviced, the day and/or time when the backhaul is to be provided, e.g., during a historically high traffic load time period or low traffic load time period.

List of Exemplary Numbered Method Embodiments

Method Embodiment 1. A communications method, the method comprising: operating a first Citizens Broadband Radio Service Device (CBSD) to establish a wireless device to device (D2D) communications link with a second CBSD using D2D wireless communications resources; operating the first CBSD to send, via the D2D communications link, a first backhaul resource reservation signal to the second CBSD to reserve a first portion of a communications backhaul extending from the second CBSD to a service provider communication network; and operating the first CBSD to communicate data for a user equipment device (UE) being served by the first CBSD to said service provider communications network via said D2D communications link and the communications backhaul extending from the second CBSD.

Method Embodiment 2. The method of method embodiment 1, further comprising: prior to establishing the wireless D2D link: i) operating the first CBSD to send a first registration signal to a first base station of a wireless network service provider (e.g., LTE marco network service provider) to register with the wireless network service provider; and ii) operating the first CBSD to send a first D2D resource request message to the first base station to request wireless D2D communications resources for communicating with the second CBSD.

Method Embodiment 3. The method of method embodiment 2, further comprising: prior to establishing the wireless D2D link operating the second CBSD to send a second registration signal to the base station of the wireless network service provider (e.g., LTE marco network service provider) to register with the wireless network service provider.

Method Embodiment 4. The method of method embodiment 3, wherein the first registration signal is a signal to register the first CBSD as a mobile service subscriber in the wireless network of the wireless network service provider; and wherein the second registration signal is a signal to register the second CBSD as a mobile service subscriber in the wireless network of wireless network service provider.

Method Embodiment 5. The method of method embodiment 4, wherein the first and second CBSDs each include a Subscriber Identity Module (SIM) card, the first CBSD appearing as a first UE to the wireless network and the second CBSD appearing as a second UE to the wireless network.

Method Embodiment 6. The method of method embodiment 5, wherein the wireless network is an LTE wireless network and the D2D communications link is an LTE D2D communications link.

Method Embodiment 7. The method of method embodiment 2, wherein said first D2D resource request message requests a first amount of wireless D2D communications resources, said first amount of wireless D2D communications resources being based on an expected amount of data to be transmitted over the backhaul of the second CBSD on behalf of user equipment devices serviced by the first CBSD during a first period of time.

Method Embodiment 8. The method of method embodiment 7, further comprising: operating the first CBSD to receive, via the D2D communications link, a backhaul resource grant signal from the second CBSD indicating that the first portion of the second CBSD's backhaul has been reserved for use by first CBSD.

Method Embodiment 9. The method of method embodiment 8, further comprising: operating the second CBSD to communicate data corresponding to a UE served by the first CBSD and data corresponding to a UE served by the second CBSD over said second CBSD's backhaul.

Method Embodiment 10. The method of method embodiment 9, wherein the first CBSD does not have a wired backhaul connection to the service provider network or the wireless service provider network.

Method Embodiment 11. The method of method embodiment 1-, wherein the first CBSD includes a first set of antennas and a second set of antennas, the method further comprising: using the first set of antennas to receive and transmit signals to the base station of the wireless network service provider and to the second CBSD; and using the second set of antennas for communications with user equipment devices served by the first CBSD.

Method Embodiment 12. The method of method embodiment 11, wherein the first CBSD communicates with the second CBSD using a first frequency band; and wherein the first CBSD communicates with user equipment devices served by the first CBSD using a second frequency band which is different from the first frequency band.

Method Embodiment 13. The method of method embodiment 12, wherein the first frequency band is a licensed frequency band used by a macro base station operator and wherein the first base station is a macro base station.

Method Embodiment 14. The method of method embodiment 13, wherein said first base station is an LTE base station and wherein said D2D communications link is an LTE D2D communications link which uses a physical resource block (PRB) allocated by the first base station for said D2D communications link between the first CBSD and the second CBSD.

Method Embodiment 15. The method of method embodiment 2, further comprising: operating the first CBSD to send a second D2D resource request message to the first base station to request wireless D2D communications resources for communicating with the second CBSD during a second period of time, said second D2D resource request message requesting a second amount of D2D communications resources different than said first D2D resource request message.

Method Embodiment 16. The method of method embodiment 15, further comprising: operating the first CBSD to send, via the D2D communications link, a second backhaul resource reservation signal to the second CBSD to reserve a second portion of the communications backhaul extending from the second CBSD to the service provider communication network, said second portion being of a different size than said first portion.

Method Embodiment 17. The method of method embodiment 16, wherein the second amount of D2D communications resources requested in said second D2D resource request message and the second portion of the communications backhaul requested by the second backhaul resource reservation signal are based upon an expected amount of traffic to be communicated over the backhaul of the second CBSD for user equipment devices served by the first CBSD during the second period of time.

Method Embodiment 18. The method of method embodiment 7, further comprising: operating the first CBSD to communicate with a Spectrum Access System (SAS) via the D2D communications link and the backhaul of the second CBSD.

List of Exemplary Numbered System Embodiments

System Embodiment 1. A communications system comprising: a first Citizens Broadband Radio Service Device (CBSD) including a first processor configured to control the first CBSD to: establish a wireless device to device (D2D) communications link with a second CBSD using D2D wireless communications resources; send, via the D2D communications link, a first backhaul resource reservation signal to the second CBSD to reserve a first portion of a communications backhaul extending from the second CBSD to a service provider communication network; and communicate data for a user equipment device (UE) being served by the first CBSD to said service provider communications network via said D2D communications link and the communications backhaul extending from the second CBSD.

System Embodiment 2. The system of system embodiment 1, wherein said first processor is further configured to control the first CSBD to perform the following operations prior to the establishment of the wireless D2D link: i) send a first registration signal to a first base station of a wireless network service provider (e.g., LTE marco network service provider) to register with the wireless network service provider; and ii) send a first D2D resource request message to the first base station to request wireless D2D communications resources for communicating with the second CBSD.

System Embodiment 3. The system of system embodiment 2, further wherein said second CBSD includes a second processor, said second processor being configured to control the second CSBD to send a second registration signal to the base station of the wireless network service provider (e.g., LTE marco network service provider) to register with the wireless network service provider prior to the establishment of the wireless D2D link.

System Embodiment 4. The system of system embodiment 3, wherein the first registration signal is a signal to register the first CBSD as a mobile service subscriber in the wireless network of the wireless network service provider; and wherein the second registration signal is a signal to register the second CBSD as a mobile service subscriber in the wireless network of wireless network service provider.

System Embodiment 5. The system of system embodiment 4, wherein the first and second CBSDs each include a Subscriber Identity Module (SIM) card, the first CBSD appearing as a first UE to the wireless network and the second CBSD appearing as a second UE to the wireless network.

System Embodiment 6. The system of system embodiment 5, wherein the wireless network is an LTE wireless network and the D2D communications link is an LTE D2D communications link.

System Embodiment 7. The system of system embodiment 2, wherein said first D2D resource request message requests a first amount of wireless D2D communications resources, said first amount of wireless D2D communications resources being based on an expected amount of data to be transmitted over the backhaul of the second CBSD on behalf of user equipment devices serviced by the first CBSD during a first period of time.

System Embodiment 8. The system of system embodiment 7, wherein said first processor is further configured to control the first CBSD to receive, via the D2D communications link, a backhaul resource grant signal from the second CBSD indicating that the first portion of the second CBSD's backhaul has been reserved for use by first CBSD.

System Embodiment 9. The system of system embodiment 8, wherein the second processor is further configured to control the second CBSD to communicate data corresponding to a UE served by the first CBSD and data corresponding to a UE served by the second CBSD over said second CBSD's backhaul.

System Embodiment 10. The system of system embodiment 9, wherein the first CBSD does not have a wired backhaul connection to the service provider network or the wireless service provider network.

System Embodiment 11. The system of system embodiment 10, wherein the first CBSD includes a first set of antennas and a second set of antennas and said first processor is further configured to control the first CBSD to: (i) use the first set of antennas to receive and transmit signals to the base station of the wireless network service provider and to the second CBSD; and (ii) use the second set of antennas for communications with user equipment devices served by the first CBSD.

System Embodiment 12. The system of system embodiment 11, wherein the first CBSD communicates with the second CBSD using a first frequency band; and wherein the first CBSD communicates with user equipment devices served by the first CBSD using a second frequency band which is different from the first frequency band.

System Embodiment 13. The system of system embodiment 12, wherein the first frequency band is a licensed frequency band used by a macro base station operator and wherein the first base station is a macro base station.

System Embodiment 14. The system of system embodiment 13, wherein said first base station is an LTE base station and wherein said D2D communications link is an LTE D2D communications link which uses a physical resource block (PRB) allocated by the first base station for said D2D communications link between the first CBSD and the second CBSD.

System Embodiment 15. The system of system embodiment 2, wherein the first processor is further configured to control the first CBSD to send a second D2D resource request message to the first base station to request wireless D2D communications resources for communicating with the second CBSD during a second period of time, said second D2D resource request message requesting a second amount of D2D communications resources different than said first D2D resource request message.

System Embodiment 16. The system of system embodiment 15, wherein the first processor is further configured to control the first CBSD to send, via the D2D communications link, a second backhaul resource reservation signal to the second CBSD to reserve a second portion of the communications backhaul extending from the second CBSD to the service provider communication network, said second portion being of a different size than said first portion.

System Embodiment 17. The system of system embodiment 16, wherein the second amount of D2D communications resources requested in said second D2D resource request message and the second portion of the communications backhaul requested by the second backhaul resource reservation signal are based upon an expected amount of traffic to be communicated over the backhaul of the second CBSD for user equipment devices served by the first CBSD during the second period of time.

System Embodiment 18. The system of system embodiment 7, wherein the first processor is further configured to control the first CBSD to communicate with a Spectrum Access System (SAS) via the D2D communications link and the backhaul of the second CBSD.

List of Exemplary Numbered Computer Readable Medium Embodiments

Computer Readable Medium Embodiment 1. A non-transitory computer readable medium including a first set of computer executable instructions which when executed by a processor of a first Citizens Broadband Radio Service Device (CBSD) cause the first CBSD to perform the steps of: establishing a wireless device to device (D2D) communications link with a second CBSD using D2D wireless communications resources; sending, via the D2D communications link, a first backhaul resource reservation signal to the second CBSD to reserve a first portion of a communications backhaul extending from the second CBSD to a service provider communication network; and communicating data for a user equipment device (UE) being served by the first CBSD to said service provider communications network via said D2D communications link and the communications backhaul extending from the second CBSD.

The techniques of various embodiments may be implemented using software, hardware and/or a combination of software and hardware. Various embodiments are directed to apparatus, e.g., CBSD, user equipment devices, SAS, Serving Gateway, PDN gateway, servers, mobility management entities, network nodes, and/or network equipment devices. Various embodiments are also directed to methods, e.g., method of controlling and/or operating CBSD devices, network nodes, SAS, nodes, servers, user equipment devices, controllers, mobility management entities or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of the elements or steps are implemented using hardware circuitry.

In various embodiments devices, servers, nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., communications nodes such as CBSD, UEs, SAS, macro base stations, eNodeBs, registrars, HSS servers, network service devices, video content servers are configured to perform the steps of the methods described as being performed by the CBSD, UEs, SAS, macro base stations, eNodeBs, registrars, HSS servers, network service devices, video content servers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., CBSD, UE, SAS, macro base station, eNodeB, registrar, HSS server, network service device, video content server, with a processor which includes a component corresponding to each of the steps of the various described methods performed by the device in which the processor is included. In some but not all embodiments a device, e.g., CBSD, UE, SAS, macro base station, eNodeB, registrar, HSS server, network service device, video content server, includes a processor corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a node, CBSD, UE, SAS, macro base station, eNodeB, registrar, HSS server, network service device, video content server. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a CBSD, UE or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the method comprising:
operating a first wireless base station to establish a wireless device to device (D2D) communications link with a second wireless base station using wireless D2D communications resources;
operating the first wireless base station to send, via the wireless D2D communications link, a first backhaul resource reservation signal to the second wireless base station to reserve a first portion of a communications backhaul extending from the second wireless base station to a service provider communications network; and
operating the first wireless base station to communicate data for a user equipment device, being served by the first wireless base station, to said service provider communications network via said wireless D2D communications link and the communications backhaul extending from the second wireless base station to the service provider communications network.

2. The method of claim 1, further comprising:
prior to establishing the wireless D2D communications link:
i) operating the first wireless base station to send a first registration signal to a third base station of a wireless network service provider to register with the wireless network service provider; and
ii) operating the first wireless base station to send a first D2D resource request message to the third wireless base station to request wireless D2D communications resources for communicating with the second wireless base station.

3. The method of claim 2, wherein said first D2D resource request message requests a first amount of wireless D2D communications resources, said first amount of wireless D2D communications resources being based on an expected amount of data to be transmitted over the communications backhaul of the second wireless base station on behalf of user equipment devices serviced by the first wireless base station during a first period of time.

4. The method of claim 3, further comprising:
operating the first wireless base station to receive, via the wireless D2D communications link, a backhaul resource grant signal from the second wireless base station indicating that the first portion of the second wireless base station's backhaul has been reserved for use by the first wireless base station.

5. The method of claim 4, further comprising:
operating the second wireless base station to communicate data corresponding to a user equipment device served by the first wireless base station and data corresponding to a user equipment device served by the second wireless base station over said second wireless base station's backhaul.

6. The method of claim 5, wherein the first wireless base station does not have a wired backhaul connection to the service provider communications network or the wireless network service provider.

7. The method of claim 6, wherein the first wireless base station includes a first set of antennas and a second set of antennas, the method further comprising:
using the first set of antennas to receive and transmit signals to the third wireless base station of the wireless network service provider and to the second wireless base station; and
using the second set of antennas for communications with user equipment devices served by the first wireless base station.

8. The method of claim 7,
wherein the first wireless base station communicates with the second wireless base station using a first frequency band; and
wherein the first wireless base station communicates with user equipment devices served by the first wireless base station using a second frequency band which is different from the first frequency band.

9. The method of claim 2, further comprising:
operating the first wireless base station to send a second D2D resource request message to the third wireless base station to request wireless D2D communications resources for communicating with the second wireless base station during a second period of time, said second D2D resource request message requesting a second amount of wireless D2D communications resources different than a first amount of wireless D2D communications resources requested by said first D2D resource request message.

10. The method of claim 9, further comprising:
operating the first wireless base station to send, via the wireless D2D communications link, a second backhaul resource reservation signal to the second wireless base station to reserve a second portion of the communications backhaul extending from the second wireless base station to the service provider communications network, said second portion being of a different size than said first portion.

11. A communications system comprising:
a first wireless base station including a first processor configured to control the first wireless base station to:
establish a wireless device to device (D2D) communications link with a second wireless base station using wireless D2D communications resources;
send, via the wireless D2D communications link, a first backhaul resource reservation signal to the second wireless base station to reserve a first portion of a communications backhaul extending from the second wireless base station to a service provider communications network; and
communicate data for a user equipment device, being served by the first wireless base station, to said service provider communications network via said wireless D2D communications link and the communications backhaul extending from the second wireless base station to the service provider communications network.

12. The system of claim 11,
wherein said first processor is further configured to control the first wireless base station to perform the following operations prior to the establishment of the wireless D2D communications link:
i) send a first registration signal to a third wireless base station of a wireless network service provider to register with the wireless network service provider; and
ii) send a first D2D resource request message to the third wireless base station to request wireless D2D communications resources for communicating with the second wireless base station.

13. The system of claim 12, wherein said first D2D resource request message requests a first amount of wireless D2D communications resources, said first amount of wireless D2D communications resources being based on an expected amount of data to be transmitted over the communications backhaul of the second wireless base station on behalf of user equipment devices serviced by the first wireless base station during a first period of time.

14. The system of claim 13,
wherein said first processor is further configured to control the first wireless base station to receive, via the wireless D2D communications link, a backhaul resource grant signal from the second wireless base station indicating that the first portion of the second wireless base station's communications backhaul has been reserved for use by the first wireless base station.

15. The system of claim 14, wherein a second processor included in the second wireless base station is configured to control the second wireless base station to communicate data corresponding to a user equipment device served by the first wireless base station and data corresponding to a user equipment device served by the second wireless base station over said second wireless base station's backhaul.

16. The system of claim 15, wherein the first wireless base station does not have a wired backhaul connection to the service provider communications network or the wireless network service provider.

17. The system of claim 16,
wherein the first wireless base station includes a first set of antennas and a second set of antennas; and
wherein said first processor is further configured to control the first wireless base station to:
(i) use the first set of antennas to receive and transmit signals to the third wireless base station of the wireless network service provider and to the second wireless base station; and
(ii) use the second set of antennas for communications with user equipment devices served by the first wireless base station.

18. The system of claim 17,
wherein the first wireless base station communicates with the second wireless base station using a first frequency band; and wherein the first wireless base station communicates with user equipment devices served by the first wireless base station using a second frequency band which is different from the first frequency band.

19. The system of claim 12, wherein the first processor is further configured to control the first wireless base station to send a second D2D resource request message to the third wireless base station to request wireless D2D communications resources for communicating with the second wireless base station during a second period of time, said second D2D resource request message requesting a second amount of wireless D2D communications resources different than a first amount of wireless D2D communications resources requested by said first D2D resource request message.

20. A non-transitory computer readable medium including a first set of computer executable instructions which when executed by a processor of a first wireless base station cause the first wireless base station to perform the steps of:

establishing a wireless device to device (D2D) communications link with a second wireless base station using wireless D2D communications resources;

sending, via the wireless D2D communications link, a first backhaul resource reservation signal to the second wireless base station to reserve a first portion of a communications backhaul extending from the second wireless base station to a service provider communications network; and communicating data for a user equipment device, being served by the first wireless base station, to said service provider communications network via said wireless D2D communications link and the communications backhaul extending from the second wireless base station to the service provider communications network.

\* \* \* \* \*